US012234886B2

(12) United States Patent
Roth, Jr.

(10) Patent No.: US 12,234,886 B2
(45) Date of Patent: Feb. 25, 2025

(54) CHAIN DAMPING SYSTEM AND METHOD

(71) Applicant: Herbert J. Roth, Jr., Kewadin, MI (US)

(72) Inventor: Herbert J. Roth, Jr., Kewadin, MI (US)

(73) Assignee: Herbert J. Roth, Kewadin, MI (US)

(*) Notice: Subject to any disclaimer, the term of this patent is extended or adjusted under 35 U.S.C. 154(b) by 521 days.

(21) Appl. No.: 17/707,083

(22) Filed: Mar. 29, 2022

(65) Prior Publication Data

US 2022/0316557 A1 Oct. 6, 2022

Related U.S. Application Data

(60) Provisional application No. 63/169,641, filed on Apr. 1, 2021.

(51) Int. Cl.
| | |
|---|---|
| *F16G 13/18* | (2006.01) |
| *B21L 9/06* | (2006.01) |
| *B63B 21/18* | (2006.01) |
| *B63B 21/20* | (2006.01) |
| *F16G 15/00* | (2006.01) |
| *B63B 21/00* | (2006.01) |

(52) U.S. Cl.
CPC ............... *F16G 13/18* (2013.01); *B21L 9/06* (2013.01); *F16G 15/00* (2013.01); *B63B 2021/005* (2013.01); *B63B 21/18* (2013.01); *B63B 21/20* (2013.01)

(58) Field of Classification Search
CPC ......... F16G 13/18; F16G 13/22; F16G 13/24; F16G 15/00; B63B 21/18; B63B 21/20; B63B 2021/005; B66B 7/066; B66C 1/125

USPC ................................ 59/79.1, 79.2, 79.3, 93
See application file for complete search history.

(56) References Cited

U.S. PATENT DOCUMENTS

| | | | | |
|---|---|---|---|---|
| 3,973,389 | A * | 8/1976 | Roberts ................... | F16G 13/16 59/35.1 |
| 7,461,501 | B1 * | 12/2008 | Bajema .................... | F16G 13/16 59/83 |
| 2012/0045277 | A1 * | 2/2012 | Sumida .................... | F16G 13/06 403/374.1 |
| 2016/0025175 | A1 * | 1/2016 | Christmas ............... | F16G 13/06 267/217 |
| 2016/0031679 | A1 * | 2/2016 | Christmas ............... | F16G 13/06 59/30 |

FOREIGN PATENT DOCUMENTS

| | | | | | |
|---|---|---|---|---|---|
| DE | 1087413 | B * | 8/1960 | | |
| JP | 7031781 | B1 * | 3/2022 | ............ | B66B 7/066 |
| WO | WO-9930962 | A1 * | 6/1999 | ............ | F16G 13/12 |

* cited by examiner

*Primary Examiner* — Jared O Brown
(74) *Attorney, Agent, or Firm* — Quinn IP Law

(57) ABSTRACT

A chain damping and shock absorber system for a chain includes one or more damping devices, each damping device installed to a segment of the chain, such that the chain and the one or more damping devices installed to a chain segment form a damped and compressed chain assembly. In response to a tensile force applied to the chain, the chain segment is extendable to an extended length which is between its compressed length and its full length. Methods of installing the chain damping and shock absorber system are provided.

15 Claims, 10 Drawing Sheets

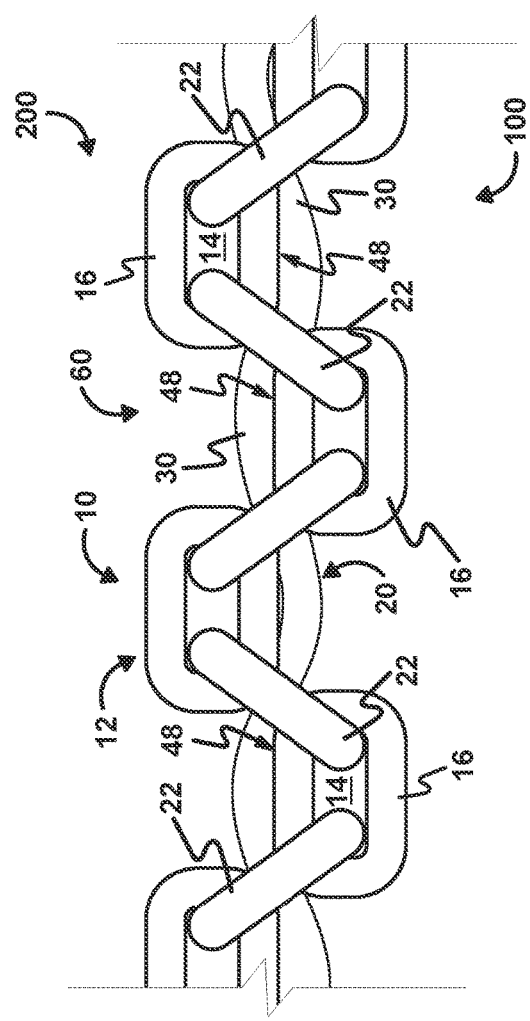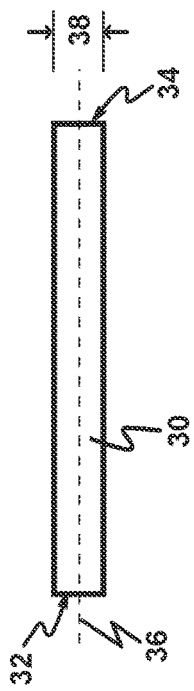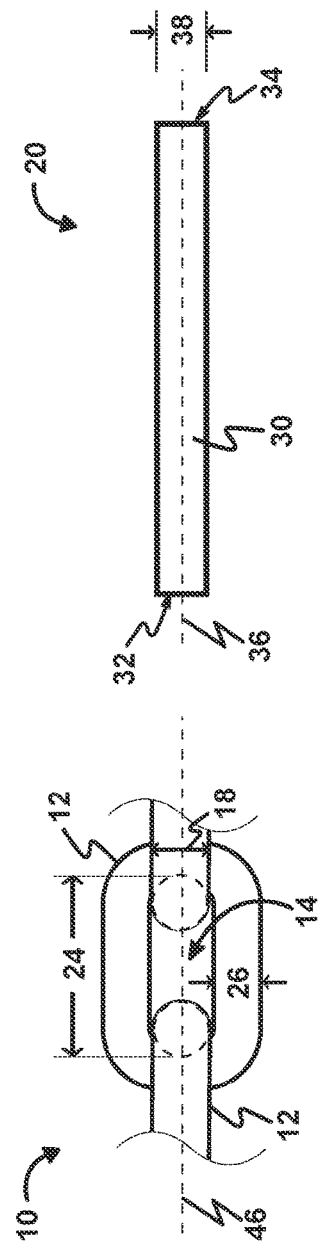
Figure 1
Figure 2
Figure 3

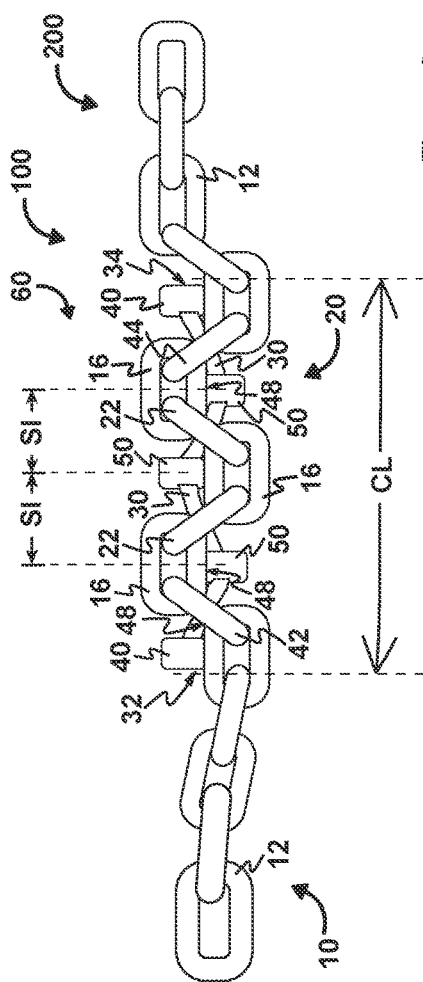
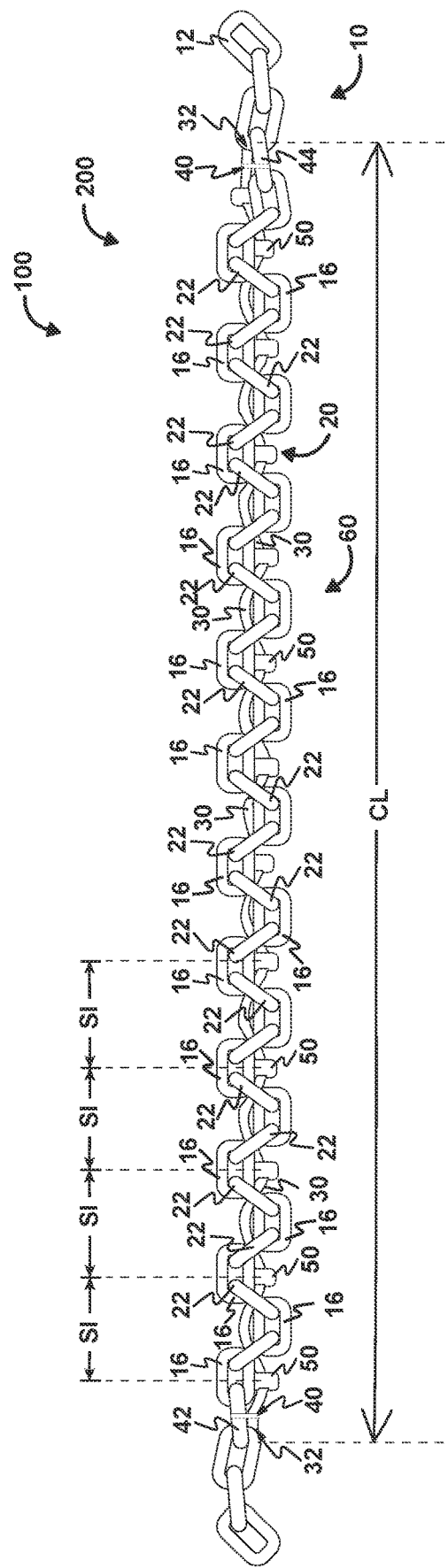
Figure 8
Figure 9

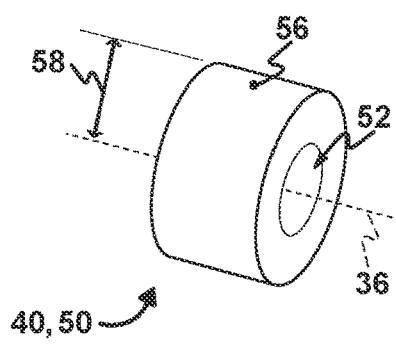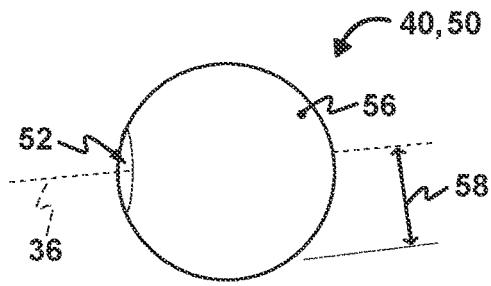
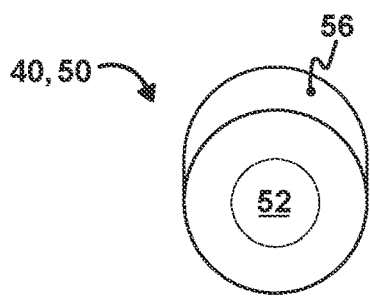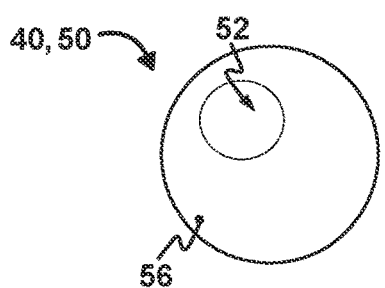
Figure 18 　　　　　　　　Figure 19
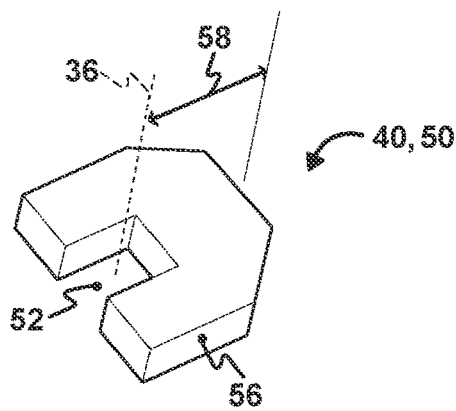
Figure 20
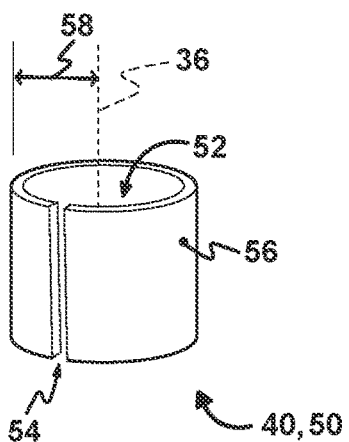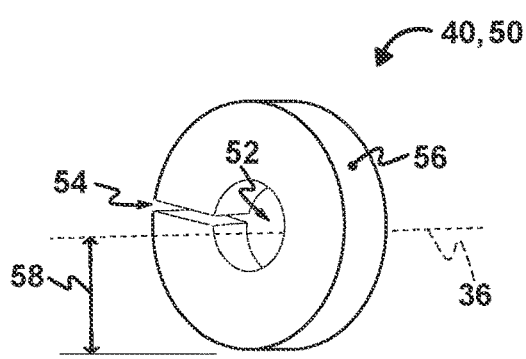
Figure 21 　　　　　　　　Figure 22

CHAIN DAMPING SYSTEM AND METHOD

CROSS REFERENCES TO RELATED APPLICATION

This Application claims the benefit of U.S. Provisional Application 63/169,641, filed Apr. 1, 2021, which is hereby incorporated by reference in its entirety.

TECHNICAL FIELD

The present disclosure relates to a chain damping and shock absorber system for installation to a chain, such as a mooring chain, for use in a mooring system for a boat, ship, platform, or other watercraft to dampen and/or absorb shock and tensile loads imposed on the mooring chain, or for use with towing chains, tie downs, lifting chains, etc. and a method of assembling the chain damping system to a chain to provide a damped chain assembly.

BACKGROUND

A type of damping device or shock absorber used with load bearing chains, such as mooring chains, which include a secondary shock line having first and second line ends attached to chain links of the chain to create slack in the chain, such that a load imposed on the chain is diverted through the secondary line, generating an elastic response in the secondary line to dampen the loading force imposed via the chain on an object attached to the chain. This type of system can be used with mooring chains, for example, to decrease the impact of shock loads on a watercraft moored to the mooring chain. This system is disadvantaged by point loading the chain at the two links to which the ends of the secondary line are attached such that, in the event of failure or separation of the secondary line, the moored watercraft is left without protection from undamped loads imposed directly on the watercraft, potentially damaging the watercraft and/or components of the watercraft such as cleats, etc. Further, in the event of failure of either of the links to which the secondary line is attached, the watercraft can become immediately disengaged from the mooring line. The material characteristics of the secondary line determines the elastic response which is generated in response to a load, such that modifying the level of elastic response, for example, in response to changes in weather or mooring conditions, e.g., changes in wind, current, water depth, can require removing and replacing the secondary line with another line suited to the anticipated changed conditions.

Another type of damping device or shock absorber installed in chain systems, such as mooring chains, includes a spring type mechanism, such as a snubber, which is installed in line with the mooring chain, such that forces imposed on the chain are passed directly through the spring type mechanism, which provides an elastic response to loads imposed on the chain. This type of damping device typically includes metal components, including spring components, which may be subject to corrosion and corrosion related failures in a marine environment. This system is disadvantaged by point loading the end of the chain to which it is attached, such that in the event of failure of the damping device and/or the chain end, the watercraft can become immediately disengaged from the mooring line. The elastic response which is generated in response to a load by this type of system is typically limited to the characteristics of the springs incorporated into the device, such that modifying the level of elastic response, for example, in response to changes in weather or mooring conditions, e.g., changes in wind, current, water depth, can require removing and replacing the spring type mechanism with another mechanism suited to the anticipated changed conditions.

Typical catenary mooring comprises a free hanging line or cable, running horizontal along the seabed, where the restoring force of the mooring line is primarily generated by the hanging weight and pretension in the line. The length of chain required to deal with changes in water depth is very large, with a scope of at least three and in some conditions more than five required, which is inefficient by consuming and requiring a large mooring space for each watercraft moored.

SUMMARY

A chain damping and shock absorber system for a chain and methods of installing the chain damping and shock absorber system are described herein. The chain damping system includes one or more damping devices, each damping device installed to a segment of the chain, such that the chain and the one or more damping devices installed to a chain segment form a damped and compressed chain assembly.

In the installed condition, the damping device compresses the chain segment to which it is installed from the fully extended length of the chain links comprising the chain segment to a compressed length, such that in response to a tensile force applied to the chain, the chain segment is extendable to an extended length which is between its compressed length and its full length. As such, the compressed overall length of the chain in an unloaded condition is shortened from the fully extended overall length of the chain by the cumulative amount of compression of the chain length by the damping devices installed to the chain, while the available overall length of the chain to respond to a tensile load exerted on the chain remains substantially the same as the full length of the chain without the damping devices installed, as each of the compressed chain segments are extendable under tensile load to their respective extended length. As further described herein, the damping device is characterized by elastic properties such that the chain segments extend between the compressed length and an extended length in response to changes in the magnitude of the tensile load exerted on the chain, and revert to the compressed condition when the tensile load is relieved. The chain assembly including the chain damping system is advantaged by being compressed in length in an unloaded condition, such that objects attached to the ends of the chain assembly (boats in a mooring field) can be positioned in closer proximity to each other, due to slack take-up in the compressed chain segments.

A method of assembling the chain damping system to the chain assembly includes configuring one of more damping devices for assembly to the chain. Each damping device includes an elastic rod, and can further include a combination of stoppers, spacers and/or attachments to the chain itself. The damping device is installed to a chain segment by first installing the elastic rod, which is installed to the respective segment of the chain by inserting the elastic rod through a plurality of non-consecutive links of the chain segment, where the non-consecutive links are referred to herein as through-links, and where each through-link is connected to an adjacent through-link by at least one bypass-link, and compressing the chain segment from the fully extended length of the chain segment to a compressed length. The method can further include installing a stopper to each end of the elastic rod to retain the elastic rod relative to the chain segment. In some embodiments, one or more spacers can be installed to the damping device, by attachment of the one or more spacers to the elastic rod within the chain segment. Other configurations can include attachment of the elastic rod directly to the chain itself. A combination of any of the above configurations can be used in a single dampening device. In an illustrative example, each spacer is positioned at a spacer interval from an adjacent spacer such that at least one through-link is intermediate to the spacer and the adjacent spacer. The damping response, elastic response, and compression of the respective chain segments are a function of the physical characteristics of the elastic rod, stoppers and/or spacers used to configure the damping device installed to the respective chain segment, and are further a function of the arrangement of the elastic rod, stoppers and/or spacers relative to the chain segment and the attachment method(s) used, including, for example, the spacer interval of the spacers relative to the chain segment and elastic rod. In an illustrative example, the damping device is removable from the chain segment and reconfigurable, such that the damping device can be selectively removed and reinstalled to the chain, and/or removed, reconfigured and reinstalled to the chain, to change the damping response and compressed overall length of the chain assembly, for example, to adapt the chain assembly for changes in use conditions. A plurality of damping devices can be installed to a chain to form the chain assembly. Each of the damping devices can be of the same configuration, or can differ from another damping device such that each of the different damping devices provides a different damping response and/or compression ratio within the respective chain segment to which it is installed, and such that each of the different damping devices can be selectively activated in response to changes in use conditions and changes in the magnitude and frequency of tensile forces imposed on the chain, providing a chain damping system which is dynamically responsive to changes in loading conditions without the need to modify or replace components of the damping system on the chain.

In an illustrative embodiment, the chain damping system can be installed to a mooring chain to provide a damped and compressed mooring chain assembly for use in a mooring system such as a mooring system for a boat, ship or other watercraft. The mooring chain assembly, including the mooring chain and one or more damping devices of the chain damping system described herein, is advantaged, for example, by its ability to dampen and/or absorb shock and tensile forces imposed on the mooring chain, for example, by wind, current, and wave conditions affecting a watercraft attached to the mooring chain, and further advantaged by its ability to dampen, absorb, and/or reduce forces imparted by the chain on the watercraft and/or to protect components of the watercraft to which the chain assembly is attached, for example, cleats, etc., from shock loads and chain loads. By compressing segments of the chain from a fully extended length of the chain segment to a compressed length, through installation of a damping device to the chain segment, the effective (compressed) overall length of the mooring chain assembly in an unloaded condition is substantially shortened, while the total overall length of the chain is retained (in a compressed condition) and is available to dynamically respond to tensile forces exerted on the mooring chain by dynamic extension of one or more of the chain segments by extending from its compressed length to its extended length. The compressed length and elastic response of the damped mooring chain assembly provides the restoring force of the mooring line thus reducing the space envelope and swing radius required for the mooring of watercraft as compared with typical catenary mooring, thus allowing for a higher density of moored watercraft in a given area when the damped mooring chain assembly described herein is used.

Further, the damped chain assembly is advantaged by the method of assembly of the damping devices to a standard (commercially available) chain, using a minimal number of components, which can be manually assembled with no special tools required. The dynamic reconfigurability of the damping devices is such that the damping system is readily modifiable for real time response to changes in use conditions, including, for example, changes in mooring conditions, including water depth, wave conditions, wind conditions, current conditions, etc. A plurality of damping devices of differing configurations can be installed to the mooring chain to form a damping mooring chain assembly where each of the installed damping device segments is configured at all times with the capability to respond, via one or more or a combination of the plurality of damping devices, with a different elastic response to a different or changed use condition, for example, light wind, heavy wind, light wave or current conditions, heavy waves, etc., such that the damping mooring chain passively provides a selective damping response which is appropriate to the actual use condition in real time, thus providing the advantage of avoiding the need to continually modify and/or change mooring lines in anticipation of changes in use conditions and protecting the moored object, e.g., the watercraft, from impact loading over a broad spectrum of loading conditions.

As described further herein, the chain damping system is advantaged by providing for a controlled response to separation, or failure of a segment, of the elastic rod within a chain segment, such that, a residual level of load damping is retained by the remaining intact elastic segments.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 1 is a schematic illustration of a portion of a chain assembly including a chain, showing a chain damping system described herein assembled to the chain to form the chain assembly, the chain damping system in a first example comprising at least one damping device installed to a segment of the chain, the damping device including an elastic rod inserted through a plurality of non-consecutive links (referred to herein as through-links) of the chain segment, the elastic rod bypassing at least one bypass-link, the bypass-link connecting adjacent through-links;

FIG. 2 is a schematic illustration of a portion of the chain of FIG. 1, showing an exemplary link of the chain;

FIG. 3 is a schematic illustration of an elastic rod such as the elastic rod included in the damping device of FIG. 1;

Figure 4:
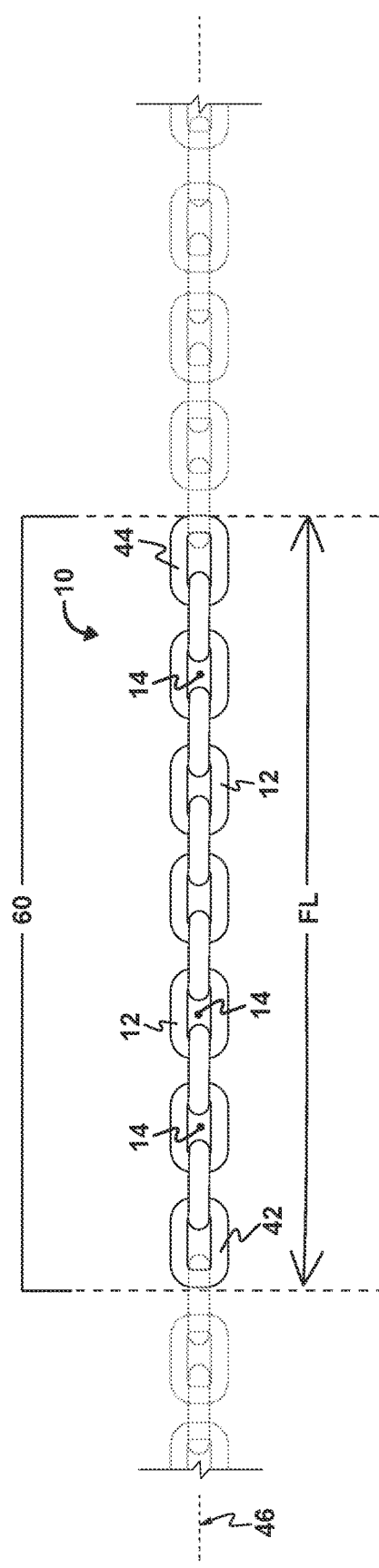
FIG. 4 is a schematic illustration of a portion of the chain of FIG. 1, the chain including a chain end and a chain segment defined by first and second end links, the chain segment extended to its full length (FL) prior to installation of the elastic rod.
Figure 5:
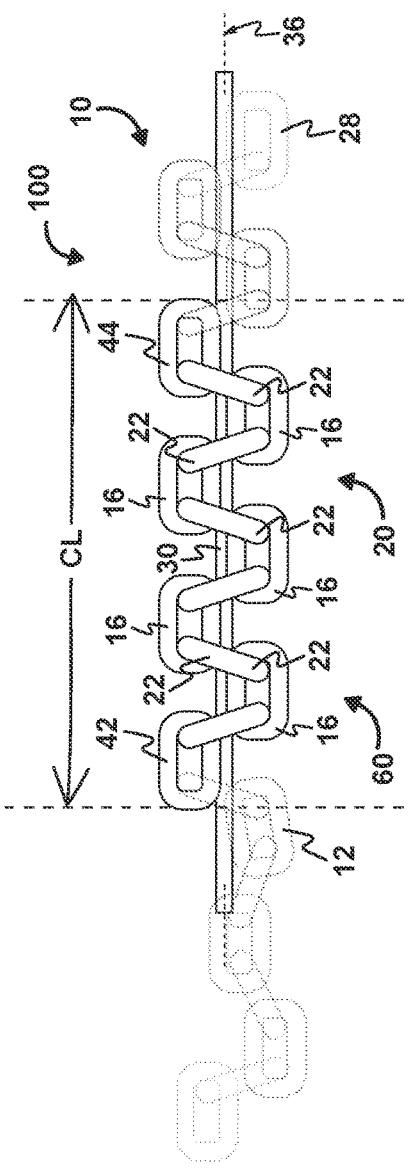
FIG. 5 is a schematic illustration illustrating compression of the chain segment of FIG. 4 from its full length (FL) to a compressed length (CL) by installation of the elastic rod through a plurality of through-links in the chain segment, the compressed length (CL) determined by the configuration of the damping device with the chain in an unloaded condition.
Figure 6:
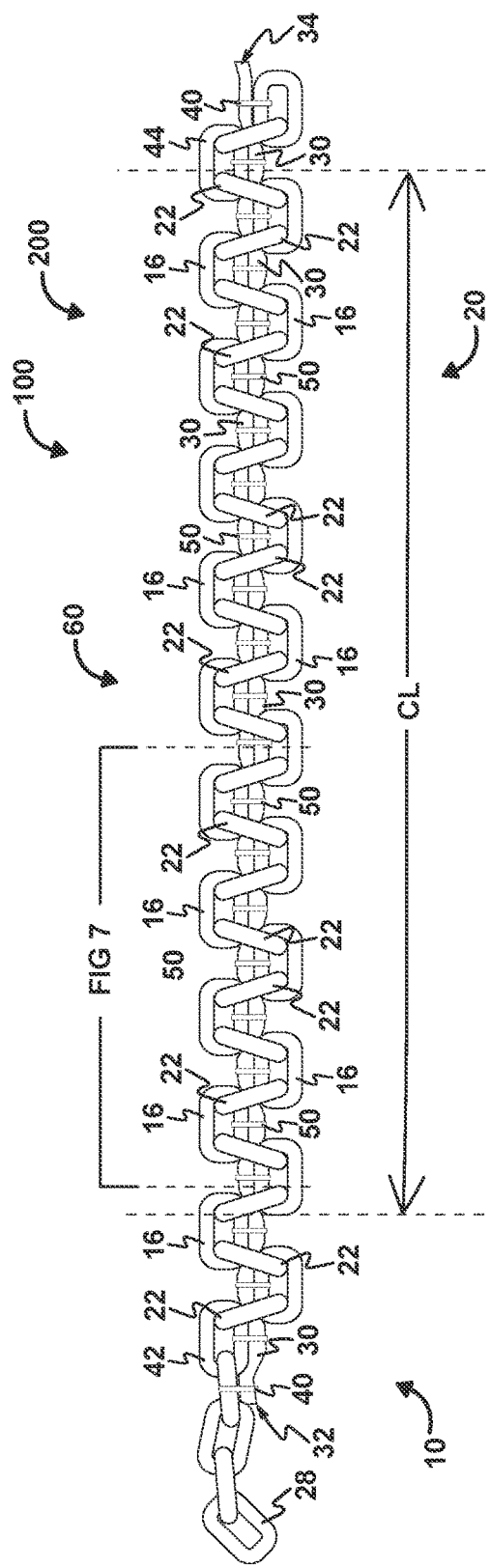
Figure 7:
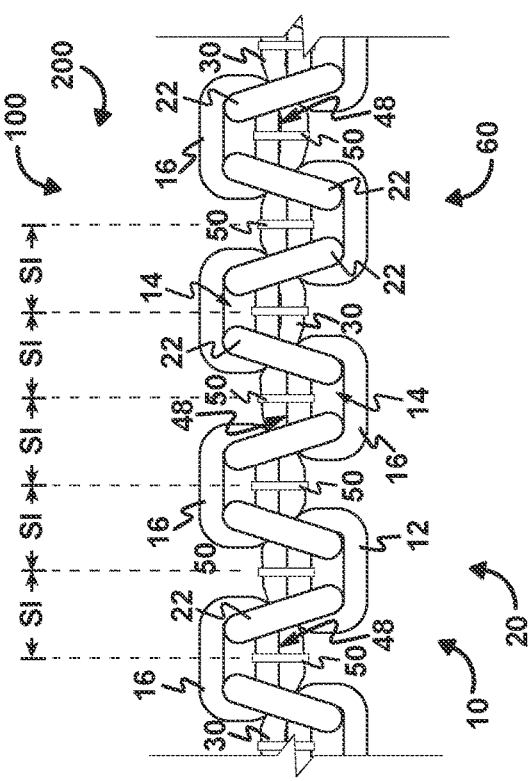
Figure 10:
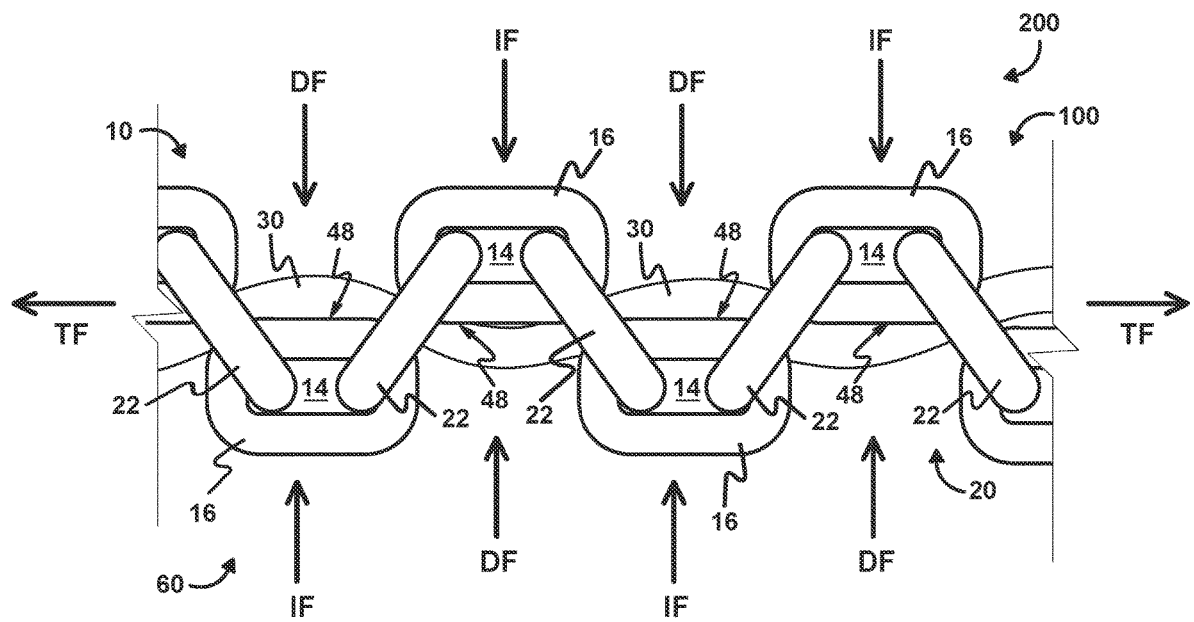
Figure 11:
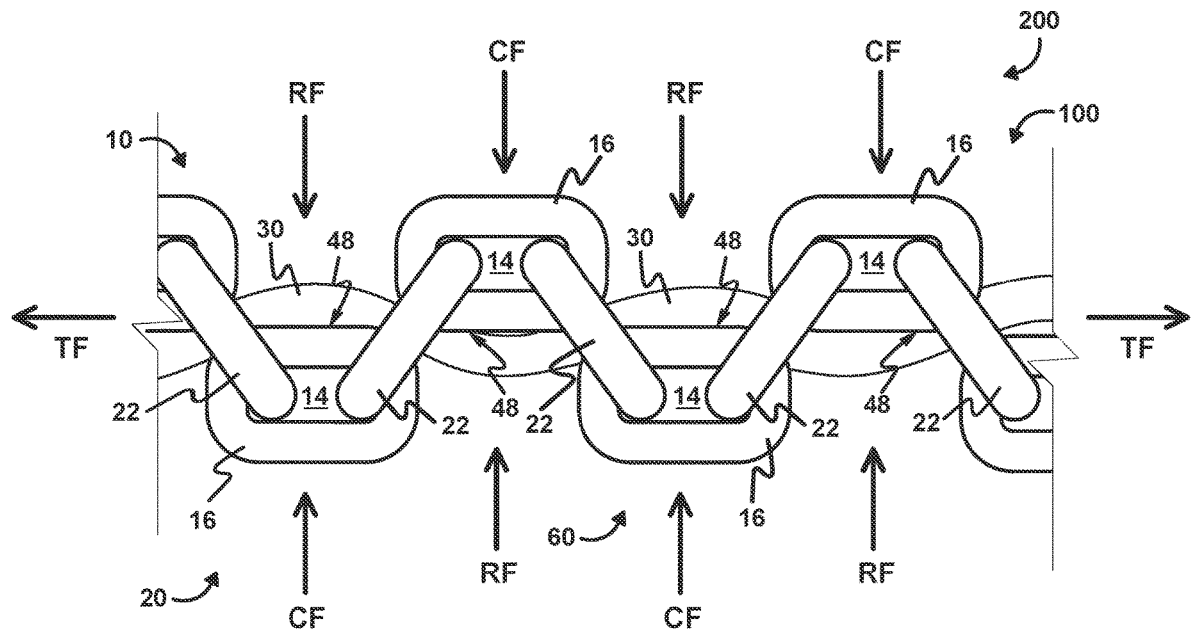
Figure 12:
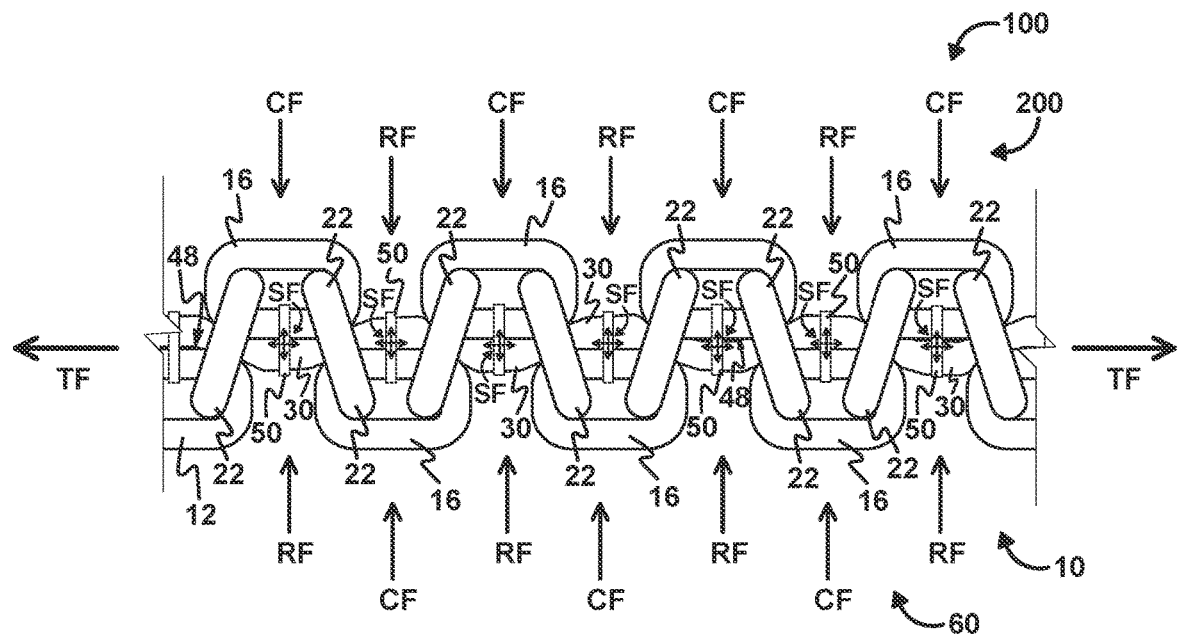
Figure 13:
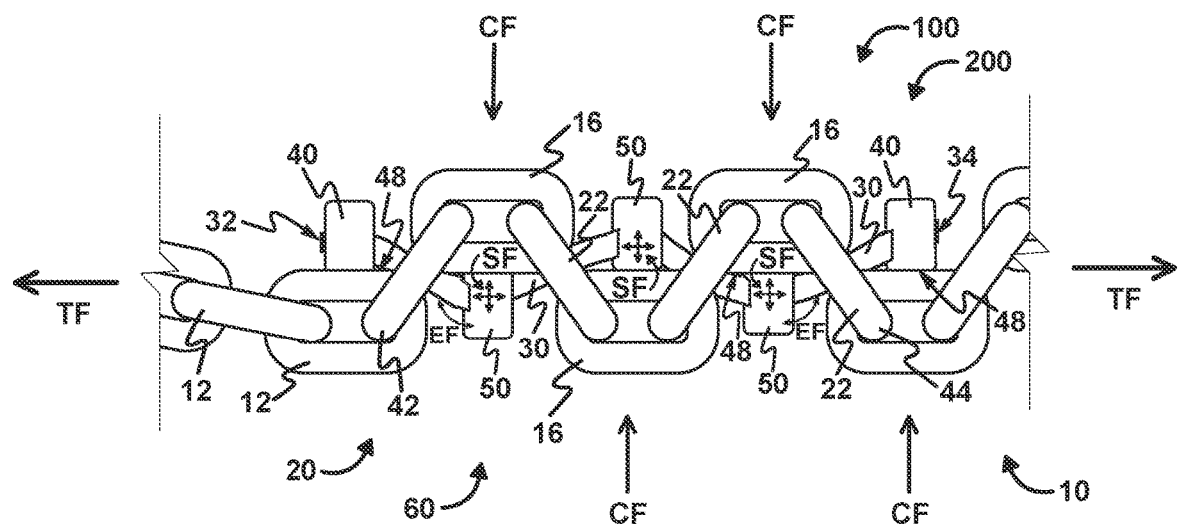
Figure 14:
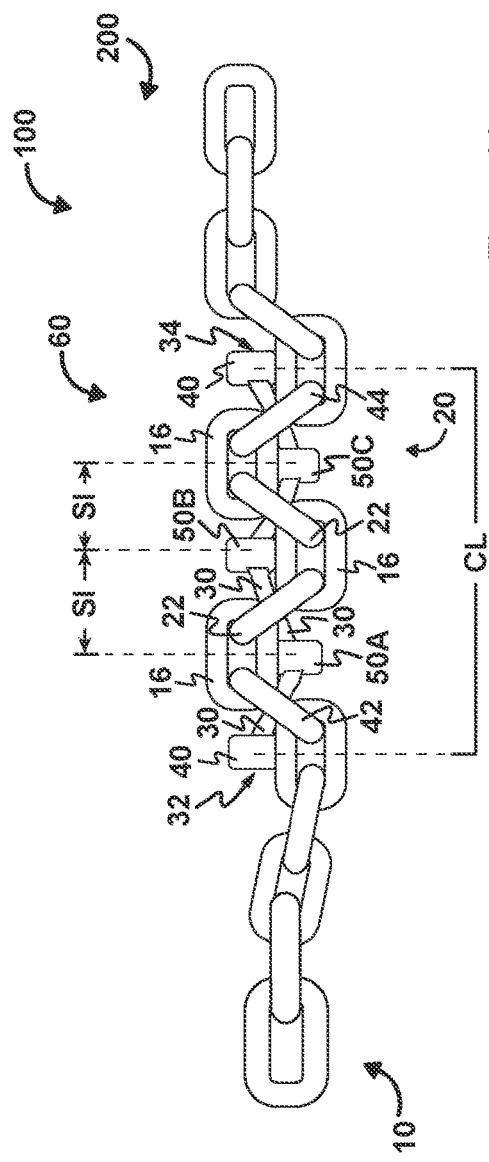
Figure 15:
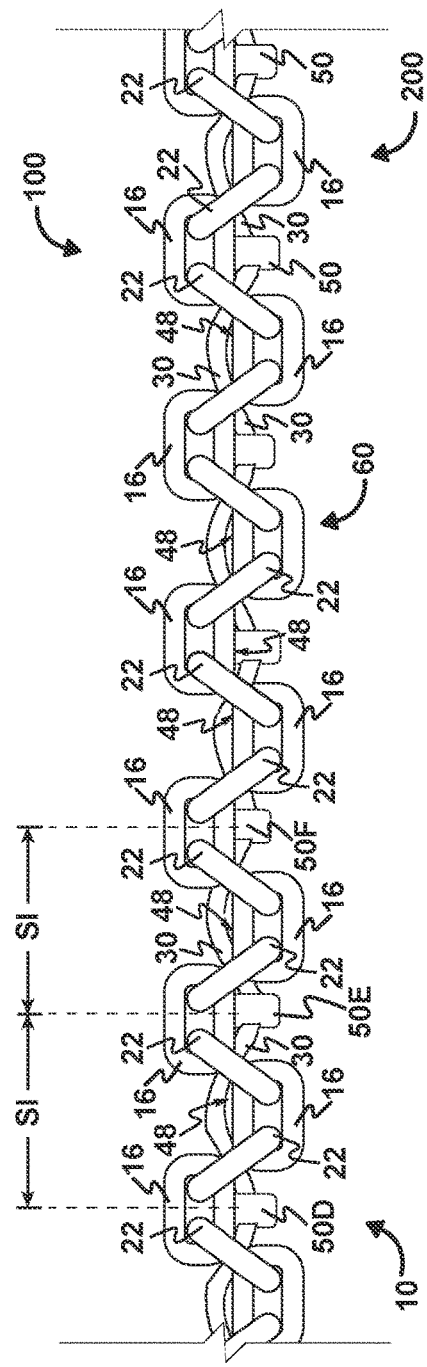

In use, as described herein and as shown in FIGS. 4 and 5 collectively, the chain segment with the elastic rod installed can extend to an extended length (EL) where the extended length (EL) of the chain segment with the elastic rod installed is longer (greater) than the compressed length CL of the chain segment with the elastic rod installed and shorter (less) than the full length FL of the chain segment without the elastic rod;

FIG. 6 is a schematic illustration showing a portion of a chain assembly including the chain damping system in a second example comprising at least one damping device assembled to a chain, the damping device comprising an elastic rod and a plurality of spacers assembled to the elastic rod and the chain, the spacers configured to retain the elastic rod to a plurality of bypass-links of the chain to define a spacer interval (SI) therebetween (see FIG. 7), the damping device further including stoppers to retain the ends of the elastic rod to the chain segment;

FIG. 7 is an enlarged portion of the schematic illustration of FIG. 6;

FIG. 8 is a schematic illustration showing a chain assembly including the chain damping system in a third example comprising at least one damping device assembled to a chain segment of the chain, the damping device including an elastic rod and a plurality of spacers assembled to the elastic rod, the spacers positioned between adjacent through-links of the chain segment to define a spacer interval (SI) therebetween, the damping device further including stoppers affixed to each end of the elastic rod to retain the elastic rod to the chain segment;

FIG. 9 is a schematic illustration showing a chain assembly including the chain damping system in a fourth example comprising at least one damping device assembled to a chain, the damping device including an elastic rod and a plurality of spacers assembled to the elastic rod, the spacers positioned on the elastic rod between every-other adjacent through-link of the chain segment and adjacent alternating bypass-links to define a spacer interval (SI) therebetween, the damping device further including stoppers affixed to each end of the elastic rod to retain the elastic rod to the chain segment;

FIG. 10 is a schematic illustration of the chain assembly of FIG. 1, illustrating a force diagram including a damping force (DF) generated by the damping device in response to an initial force (IF), such as a shock load, exerted by the chain segment on the elastic rod of the damping device, the shock load IF resulting from a tensile force (TF) exerted on the chain in use, the tensile force TF causing extension of the chain segment, increasing contact between the chain segment and the elastic rod at a plurality of contact interfaces;

FIG. 11 is a schematic illustration of the chain assembly of FIG. 1, illustrating a force diagram including rod force (RF) generated by the damping device in response to chain force (CF) exerted by the chain segment on the elastic rod at the plurality of contact interfaces, the chain force CF resulting from the tensile force (TF) exerted on the chain in use;

FIG. 12 is a schematic illustration of a portion of the chain assembly of FIG. 6, with the rod attached to chain segments, illustrating a force diagram including a rod force (RF) and a spacer force (SF) generated by the damping device in response to a chain force (CF) exerted by the chain segment on the elastic rod of the damping device, the chain force CF resulting from the tensile force (TF) exerted on the chain in use;

FIG. 13 is a schematic illustration of a portion of the chain assembly of FIG. 8, illustrating a force diagram including an elongation force (EF) and a spacer force (SF) generated by the damping device in response to a chain force (CF) exerted by the chain segment on the elastic rod of the damping device, the chain force (CF) resulting from the tensile force (TF) exerted on the chain in use;

FIG. 14 is a schematic illustration showing the chain assembly including the chain damping system of FIG. 8 illustrating a first example arrangement of spacers in a damping device having a compression ratio (CR) defined by the ratio of the full length EL of the chain segment to the compressed length CL of the chain segment;

FIG. 15 is a schematic illustration showing the chain assembly including the chain damping system of FIG. 9 illustrating a second example arrangement of spacers at alternating segments in a damping device.

Figure 16:
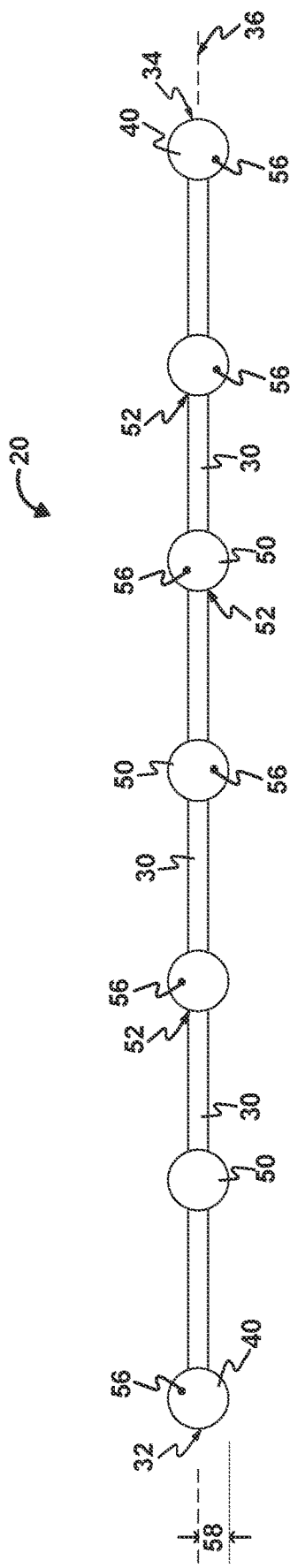
Figure 17:
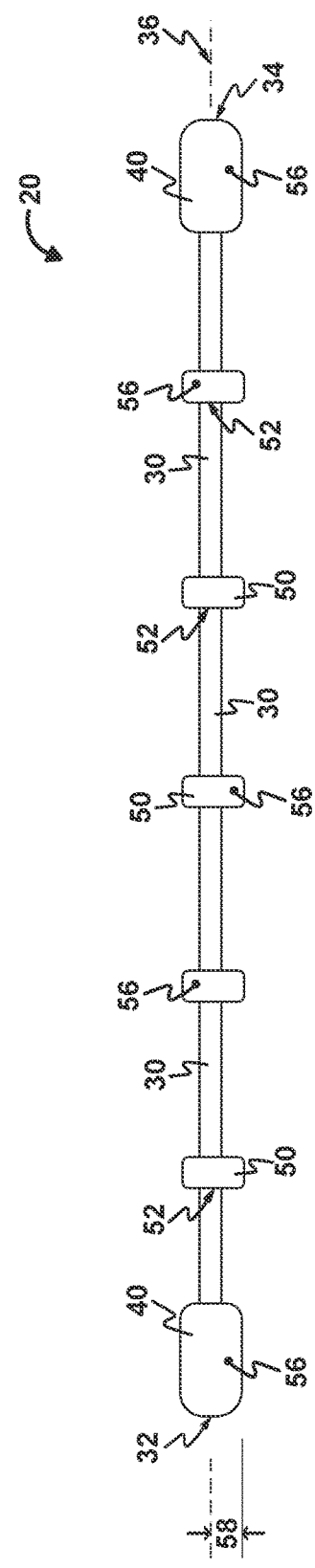
Figure 23:
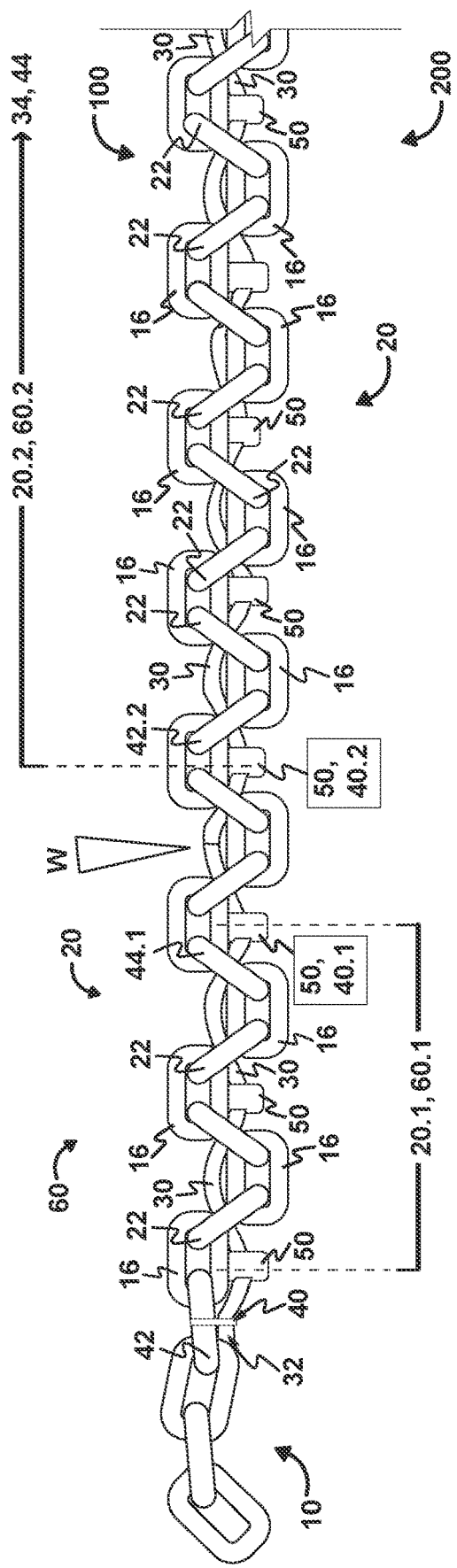

FIG. 16 is a perspective side view of a schematic illustration of an exemplary damping device;

FIG. 17 is a perspective side view of a schematic illustration of another exemplary damping device;

FIG. 18 includes perspective side and end views of a schematic illustration of an exemplary spacer and/or stopper;

FIG. 19 includes perspective side and top views of a schematic illustration of another exemplary spacer and/or stopper;

FIG. 20 is a perspective side view of a schematic illustration of another exemplary spacer and/or stopper;

FIG. 21 is a perspective side view of a schematic illustration of another exemplary spacer and/or stopper;

FIG. 22 is a perspective side view of a schematic illustration of another exemplary spacer and/or stopper;

FIG. 23 is a schematic illustration of a portion of the chain assembly of FIG. 9, illustrating division of an installed damping device into first and second damping devices by separation of the elastic rod of the installed damping device; and

DETAILED DESCRIPTION

The components of the disclosed embodiments, as described and illustrated herein, may be arranged and designed in a variety of different configurations. Thus, the following detailed description, in conjunction with the accompanying drawings, is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. The following listing of elements shown in FIGS. 1-23 is provided for reference only, and is not intended to be limiting:

100 chain damping system
200 damped chain assembly
10 chain
12 link
14 aperture (of link)
16 bypass-link
18 inside width (of aperture)

20 damping device
22 through-link
24 pitch (inside length of aperture)
26 wire diameter (of chain link)
28 chain end
30 elastic rod
32 first rod end (of elastic rod)
34 second rod end (of elastic rod)
36 rod axis (longitudinal axis of rod)
38 rod diameter
40 stopper
42 first end link (of chain segment)
44 second end link (of chain segment)
46 chain axis (longitudinal axis of chain)
48 contact interface
50 spacer
52 opening (in spacer)
54 slot
56 outer surface
58 interface dimension
60 chain segment
FL full length (of chain segment)
EL extended length (of chain segment)
CL compressed length
SI spacer interval
CR compression ratio (FL/CL)
IF initial force
TF tensile force
DF damping force
RF rod force
SF spacer force
EF elongation force Referring to the drawings, wherein like reference numerals are used to identify like or identical components in the various views, a chain damping and shock absorber system 100 for a chain 10 and methods of installing the chain damping and shock absorber system 100 are described herein. The chain damping and shock absorber system 100 may be referred herein as a chain damping system. The chain damping system 100 includes one or more damping devices 20, each damping device 20 installed to a chain segment 60 of the chain, each damping device including an elastic rod 30, such that the chain 10 and the one or more damping devices 20 installed to a chain segment 60 form a damped chain assembly 200, also referred to herein as a compressed chain assembly 200, or as a chain assembly 200. As such, the term chain assembly 200 refers to the entire length of the chain 10, including one or more chain segments 60 to which damping devices 20 have been installed, and the chain links 12 which precede or succeed the chain segments 60 in the chain 10. As illustrated by FIGS. 4 and 5, the chain links 12 comprising the chain segment 60 have a fully extended length FL prior to installation of the elastic rod 30, such that in the installed condition, the chain segment 60 is compressed by the damping device 20, including the elastic rod 30, from the fully extended length FL of the chain links 12 comprising the chain segment 60 to a compressed length CL. In response to a tensile force TF is applied to the chain 10, the chain segment 60 with the elastic rod 30 installed is extendable to an extended length EL which is between its compressed length CL and its full length FL, such that CL<EL<FL. As such, the overall length of the chain assembly 200 including the compressed chain segments 60, in an unloaded condition, is shortened from the overall length of the unmodified chain 10 by the cumulative amount of compression of the chain length by the damping devices 20 installed to the chain 10, while the available overall length of the chain 10 to respond to a tensile load exerted on the chain assembly 200 remains substantially the same as the full length of the unmodified chain 10 (without the damping devices 20 installed), as each of the compressed chain segments 60 are extendable under tensile load to their respective extended length EL. As further described herein, the damping device 20 is characterized by elastic properties such that each of the chain segments 60 extend between their respective compressed length CL and an extended length EL in response to changes in the magnitude of the tensile force TF exerted on the chain 10 and chain assembly 200, and revert to the compressed condition when the tensile force TF is relieved. The chain assembly 200 including the chain damping system 100 is advantaged by being compressed in length in an unloaded condition, such that objects, for example, boats in a mooring field, attached to the ends 28 of the chain assembly 200 can be positioned in closer proximity to each other, due to slack take-up, and resulting shorter scope, in the compressed chain segments 60 and a reduced swing radius.

A method of assembling the chain damping system 100 to the chain 10 to form the chain assembly 200 includes configuring one or more damping devices 20 for assembly to the chain 10. Each damping device 20 includes an elastic rod 30, and can further include a combination of stoppers 40 and/or spacers 50. The damping device 20 is installed to a chain segment 60 by first installing the elastic rod 30, which is installed to the respective segment of the chain 10 by inserting the elastic rod 30 through a plurality of non-consecutive links of the chain segment 60, where the non-consecutive links through which the elastic rod 30 is inserted are referred to herein as through-links 22, and where each through-link 22 is connected to an adjacent through-link 22 by at least one bypass-link 16, and compressing the chain segment 60 from the fully extended length FL of the chain segment 60 to a compressed length CL as illustrated in FIGS. 4 and 5.

The method can further include installing a stopper 40 to each end 32, 34 of the elastic rod 30, as illustrated in FIGS. 6, 8 and 9, to retain the elastic rod 30 relative to the chain segment 60, and to retain the chain segment 60 in an unloaded condition at the compressed length CL. In the examples shown in FIGS. 6, 8 and 9, the chain segment 60 includes a first end link 42 and a second end link 44, and a plurality of bypass-links 16 and through-links 22 therebetween, where the bypass-links and through-links 16, 22 comprising the chain segment 60 are compressed to the compressed length CL and retained in a compressed condition between the stoppers 40 attached to the rod ends 32, 34. The ratio of the fully extended length FL to the compressed length CL is referred to herein as a compression ratio CR, where CR=FL/CL. In the example illustrated by FIGS. 4 and 5, the chain segment 60 defined by end links 42, 44 has a fully extended length FL of about 20.5 inches as shown in FIG. 4, and a compressed length CL of about 12 inches, as shown in FIG. 5, such that the chain segment 60 has a compression ratio CR of about 1.7. Accordingly, when unloaded, the chain segment has a compressed length which is about 58.5% of its fully extended length, and can lengthen in response to a tensile force TF imposed on the chain 10, from its compressed length CL of 12 inches to an extended length EL between 12 inches and approximately 20.5 inches, as the damping device 20 including the elastic rod 30 responds elastically and elongates in response to the tensile force TF.

In some embodiments, referring to FIGS. 6-9 and FIGS. 14 and 15, one or more spacers 50 can be installed to the damping device 20, by attachment of the one or more spacers 50 to the elastic rod 30 within the chain segment 60. In an illustrative example, each spacer 50 is positioned at a spacer interval SI from an adjacent spacer 50 such that at least one through-link 22 is intermediate the spacer 50 and the adjacent spacer 50. The damping response and elastic response of the respective chain segment 60, and the compressed length CL and compression ratio CR of the respective chain segment 60 are a function of the physical and material characteristics of the elastic rod 30, stoppers 40 and/or spacers 50 used to configure the damping device 20 installed to the respective chain segment 60, and are further a function of the arrangement and/or positioning of the elastic rod 20, stoppers and/or spacers 50 relative to the chain segment 60 including, for example, the spacer interval SI of the spacers 50 relative to the chain segment 60 and elastic rod 30 and the attachment methods used to attach the damping device 20 to the first and last end links 42, 44 of the chain segment and to attach the stoppers 40 and the spacers 50 to the elastic rod 30 and/or the links 16, 22 of the chain segment 60. In an illustrative example, the damping device 20 is removable from the chain segment 60 and reconfigurable, such that the damping device 20 can be selectively removed from and reinstalled to the chain 10 or another chain 10, and/or removed, reconfigured and reinstalled to the chain 10, to change the damping response and overall length of the compressed chain assembly 200, for example, to adapt the chain assembly 200 for changes in use conditions. A plurality of damping devices 20 can be installed to a single chain 10 to form the chain assembly 200 including multiple chain segments 60 each including a damping device 20. Each of the damping devices 20 installed to a different chain segment 60 of a single chain 10 can be of the same configuration, or a damping device 20 can differ from another damping device 20 in a single chain 10 such that in the latter example, each of the different damping devices 20 provides a different damping response and/or compression ratio CR within the respective chain segment 60 to which it is installed.

In an illustrative embodiment, chain damping system 100 can be installed to a mooring chain 10 to provide a damped and compressed mooring chain assembly 200 for use in a mooring system such as a mooring system for a boat, ship, platform, or other watercraft. The mooring chain assembly 200 including the mooring chain 10 and one for more damping devices 20 of the chain damping system 100 described herein, is advantaged, for example, by its ability to dampen and/or absorb initial shock forces IF and tensile forces TF imposed on the mooring chain, for example, by wind, current, and wave conditions affecting a watercraft attached to the mooring chain, and further advantaged by its ability to dampen, absorb, and/or reduce forces imparted by the chain 10 on the watercraft and/or to protect components of the watercraft to which the chain assembly 200 is attached, for example, cleats, etc. from chain forces CF including initial shock/snatch loads (initial forces IF) and/or chain forces CF which change over time. By compressing one or more segments 60 of the chain 10 from a fully extended length EL of each chain segment 60 to a compressed length CL, through installation of a damping device 20 to the respective chain segment 60, the effective overall length of the compressed mooring chain assembly 200 in an unloaded condition is substantially shortened, while the extended overall length of the mooring chain assembly 200 is available to dynamically respond to tensile forces TF exerted on the mooring chain 10, where the response is provided by extension of the compressed chain segments 60 to an extended length EL (where $CL<EL\leq FL$) and the dynamic elastic response, including damping and elongation, of the damping devices 20 installed to the chain segments 60. The compressed length CL and elastic response of the damped mooring chain assembly 200 provides the restoring force of the mooring line 10 thus reducing the space envelope required for mooring of the watercraft, as compared with typical catenary mooring, and thus allowing for a higher density of moored watercraft in a given area when a damping mooring chain assembly 200 including a chain damping system 100 and damping device(s) 20 described herein is used. The mooring chain assembly 200, by having a compressed length, also allows the chain to be elevated off the seabed, reducing wear and tear on the mooring chain itself.

Further, the damped chain assembly 200 is advantaged by the method of assembly of the damping devices 20 to a standard (commercially available) chain, using a minimal number of components 30, 40, 50 which can be assembled manually or with minimal standard tools, such that no special tools are required, and such that configuration, assembly and installation of the damping devices 20 is readily performed on site, for example, at a mooring location, on a watercraft, etc. The dynamic reconfigurability of the damping devices 20 is such that the chain damping system 100 is readily modifiable at any time and location, to provide for real time response to changes in use conditions, including, for example, changes in mooring conditions, including water depth, wave conditions, wind conditions, current conditions, etc. A plurality of damping devices 20 of differing configurations and differing elastic responses can be installed to a standard mooring chain 10 to form a damped and compressed mooring chain assembly 200 where each of the damping devices 20 is configured, e.g., customized, to respond to a different anticipated use condition, for example, light wind, heavy wind, light wave or current conditions, heavy waves, etc., such that the damped mooring chain assembly 200 passively provides a selective damping response which is appropriate to the actual use condition in real time, thus providing the advantage of avoiding continual modification and/or changing of mooring lines in anticipation of changes in use conditions and the advantage of protecting the moored object, e.g., the watercraft, from impact loading over a broad spectrum of loading and force conditions.

FIGS. 1-9 illustrate the various components 30, 40, 50 of the chain damping system 100 which can be installed to a chain 10 in different configurations to form a plurality of damping devices 20 and are described herein. FIGS. 10-13 illustrate force diagrams showing the damping and elastic response of the various components 30, 40, 50 and damping devices 20 in response to chain forces CF generated in response to tensile forces TF imposed on the chain 10 to which the chain damping system 100 is installed, and are described herein. FIGS. 14-22 illustrate non-limiting examples of various configurations and/or arrangements of components 30, 40, 50 which can be assembled and/or installed to a chain segment 60 to form a damping device 20. In a non-limiting illustrative example, a damped mooring chain assembly 200 formed by installing a chain damping system 100 including a plurality of damping devices 20 to a mooring chain 10, and a method of installing the chain damping system 100 to the mooring chain 10, is described herein. FIG. 23 illustrates a controlled response of a damped mooring chain assembly 200 to a separation and/or division of an elastic rod 30 in a chain segment 60 of a damped mooring chain assembly 200.

Description of Damping Device, Device Components and Methods

FIGS. 1-9 illustrate the various components 30, 40, 50 of the chain damping system 100 which can be installed to a chain 10 in different configurations to form a plurality of damping devices 20 and are described herein.

Referring to FIG. 1, shown is a schematic view of a portion of a chain assembly 200 including a chain damping system 100 installed to a chain segment 60 of a chain 10. The chain damping system 100 includes one or more damping devices 20, each installed to a respective segment 60 of the chain 10. In the example shown in FIG. 1, the damping device 20 includes an elastic rod 30 inserted through a plurality of non-consecutive links 22, where the links through which the elastic rod 30 is inserted are referred to herein as through-links 22 of the chain segment 60, the elastic rod 30 bypassing at least one bypass-link 16, where in the example shown, the bypass-link 16 connects adjacent through-links 22. As installed, the elastic rod 30 of the damping device 20 is in contact with the links 16, 22 to define a plurality of contact interfaces 48 therebetween. For example, referring to FIG. 1, a contact interface indicated at 48 in the center of FIG. 1 (as viewed on the page) is defined by the area of contact between the outer surface of the elastic rod 30 and the wire surface of the bypass link 16. See also FIG. 15 showing the contact interface 48 defined by the elastic rod 30 in contact with the chain surface of the bypass-links 16. Other contact interfaces 48 are defined, for example, by the areas of contact between the outer surface of the elastic rod 30 in contact with the wire surface defining the aperture 14 of the through-link 22 through which the elastic rod 30 is inserted. In use, and under loading, the elastic rod 30 and/or other components, such as stoppers 40 and spacers 50 comprising the damping device 20, make contact at the various contact interfaces 48, where the size (area) and shape of the each contact interface 48 varies as the tensile force TF exerted on the chain 10 changes, in response to a chain force CF resultant from the tensile ford TF exerted on and deforming the elastic rod 30 and/or the stoppers 40 and spacers 50, and in response to rod forces RF and spacer forces SF exerted by the damping device 20 on the chain segment 60, as installed and in response to the tensile force TF and chain force CF, as illustrated by FIGS. 8, 10-13 and 15, and further described herein.

Referring to FIG. 2, a schematic illustration of a portion of the chain 10 of FIG. 1 is shown, including exemplary links 12 of the chain 10. The chain 10 can be formed from a metal wire, wherein links 12 are formed and welded together in an interlocking arrangement to form the chain 10. In the example shown, the metal wire forming the link 10 is characterized by a wire diameter 26. The link 10 defines an opening or aperture 14, the aperture having an inside width 18 and an inside length 24. The inside length 24 is also referred to as the pitch. The chain 10 defines a chain axis 46, such that when the chain 10 is in a fully extended condition, the chain axis 46 is the longitudinal axis of the chain 10. The chain 10 can be made of any material providing suitable working load limit for the anticipated use of the chain 10. In a non-limiting example, the chain 10 is a metal welded chain, where the metal can be, for example, steel or aluminum. In a non-limiting example, the chain 10 is configured for use as a mooring chain, which in a non-limiting example is a ⅜" steel chain.

FIG. 3 is a schematic illustration of an elastic rod 30 such as the elastic rod 30 included in the damping device 20 of FIG. 1. The elastic rod 30 is made of an elastic material, e.g., a material characterized by elastic properties such that the elastic rod 30 provides an elastic response and/or elastically deforms under load and exhibits an elastic recovery when an applied load is reduced or removed. The elastic material can include one or more of an elastomer, polymer, or synthetic or natural rubber-based material. The elastic material can be comprised of one or more of, for example, neoprene, silicone, nitrile (Buna-N), Buna-N/Vinyl, Viton fluoroelastomer, Aflas, EPDM, Butyl, Hypalon natural rubber, isoprene, SBR, polyurethane, thermoplastic polyurethane, silicone, fluorosilicone, Kalrez, natural gum, Butyl, santoprene, and/or a combination of these. The elastic material can have a durometer within the range of 60 A to 75 D, with the durometer selected for the anticipated conditions of use of the intended application of the damping device 20. For example, an elastic rod 30 having a relatively lower durometer in the range of 60 A to 80 A and relatively high elasticity may be included in a damping device 20 configured to respond dynamically to relatively light chain forces CF and/or lighter and intermittent tensile forces TF imposed on a chain 10 to which the elastic rod 10 is installed. In another example, an elastic rod 30 having a relatively higher durometer in the range of 90 A to 75 D and relatively lower elasticity may be included in a damping device 20 configured to respond dynamically to relatively higher chain forces CF and/or higher and/or sustained tensile forces TF imposed on a chain 10 to which the elastic rod 10 is installed.

The elastic rod 10 includes first and second rod ends 32, 34, and can be provided in different lengths as required by the specific application of the damping device 20 including the elastic rod 30. By way of example, the elastic rod 30 can have a rod length within the range of about 2 to 40 feet for damping devices 20 configured for marine, towing, hoist and lifting chain assemblies. The example is non-limiting, and damping devices 20 including elastic rods 30 which are less than 2 feet or greater than 40 feet can be configured. The elastic rod 30 as shown in the figures has a round cross section characterized by a diameter 38. Elastic rods 30 having other cross-sectional shapes, including for example, oval, square, rectangular, hexagonal, etc. cross-sectional shapes, can be used, to modify the shape and size of the contact interface 48 formed between the elastic rod 30 and the chain surface, to affect or vary the damping and elastic responses of the elastic rod 30 and the damping device 20. In a non-limiting example, the diameter 38 of the elastic rod 30 is slightly smaller than the inside width 18 of the chain aperture 14, to provide sufficient clearance for insertion of the elastic rod 30 and to allow for compression of the chain links 12 of the chain segment 60 on the elastic rod 30. By way of illustrative example, Table 1 shows combinations of chain sizes and elastic rod diameters which can be used in assembling a damped chain assembly 200 including one or more damping devices 20.

TABLE 1

| Chain size (trade size - Imperial) | Wire diameter (in.) | Pitch (inside length) (in.) | Inside width (aperture) (in.) | Elastic rod diameter (in.) | Rod to chain link clearance (in.) |
|---|---|---|---|---|---|
| ⅜ | 0.404 | 1.630 | 0.650 | 0.500 | 0.125 |
| ½ | 0.528 | 2.070 | 0.870 | 0.750 | 0.125 |
| ⅝ | 0.630 | 2.530 | 0.920 | 0.750 | 0.125 |
| ¾ | 0.781 | 2.990 | 1.040 | 0.825 | 0.125 |

FIGS. 4 and 5 illustrate installation of an elastic rod 30 to a chain segment 60 of a chain 10, including compression of the chain segment 60 from a fully extended length FL of the chain segment 60 measured from a first end link 42 of the chain segment 60 to a second (or last) end link 44 of the chain segment 60, to a compressed length CL of the chain segment 60 as positioned on the elastic rod 30. As shown in the figure, the elastic rod 30 is installed to the chain segment 60 by insertion of the elastic rod 30 through a plurality of through-links 22 in the chain segment 60, with the elastic rod 30 bypassing at least one bypass-link 16 between each through-link 22. The links 12 of the chain segment 60 are compressed on the elastic rod 30, as shown in FIG. 5, such that the damping device 20 comprising the chain segment 60 compressed on to the elastic rod 30 is defined by a compressed length (CL) measured from a first end link 42 of the chain segment 60 to a second (or last) end link 44 of the chain segment 60 as compressed on the elastic rod 30. The amount of compression and a compression ratio CR defined as the ratio of the fully extended length FL to the compressed length CL (CR=FL/CL) is determined by the configuration of the damping device 20, including the compression density of the chain links 12 on the elastic rod 30, and other factors, such as the addition of spacers 50 positioned on and/or attached to the elastic rod 30, as shown, for example, in FIGS. 6-9.

In use, as described in further detail herein, the chain segment 60, compressed by installation of the damping device 20, can extend from its compressed length CL to an extended length (EL) when subjected to a tensile force TF exerted on the chain 10, where the extended length (EL) of the chain segment is longer (greater) than the compressed length CL and shorter (less) than the full length FL of the chain segment. When the tensile force TF exerted on the chain 10 is reduced or removed, the elastic response of the damping device 20 including the elastic rod 30 acts on the chain segment 60 to compress the chain segment 60, such that when unloaded, the chain segment 60 returns a compressed condition, e.g., to its compressed length CL.

In an illustrative example, a damping device 20 including a ½" diameter elastic rod 30 made of abrasion resistant polyurethane and having a hardness of 80 A durometer was inserted through alternating chain links 12 of chain segment 60 of a ⅜" steel chain, e.g., inserted such that one bypass-link 16 was intermediate adjacent through-links 22. The chain segment 60 had a fully extended length FL of 44 inches, and after assembly of the elastic rod 30 and compression of the chain links 12 on the elastic rod 30, exhibited a compressed length CL of 41 inches, yielding a compression ratio CR of 1.073, or a compressed length CL which was about 93% of the fully extended length FL of the chain segment 60 without the elastic rod 30 installed. With the elastic rod 30 installed, the chain segment 60 was extendable to a maximum extended length EL of 43.8 inches, such that the chain segment 60 with the elastic rod 30 installed was extendable to 99.5% to 99.8% of its fully extended length FL.

In another illustrative example, a damping device 20 including a ½" diameter elastic rod 30 made of abrasion resistant polyurethane and having a hardness of 90 A durometer was inserted through alternating chain links 12 of chain segment 60 of a ⅜" steel chain, e.g., inserted such that one bypass-link 16 was intermediate adjacent through-links 22. The chain segment 60 had a fully extended length FL of 44 inches, and after assembly of the elastic rod 30 and compression of the chain links 12 on the elastic rod 30, exhibited a compressed length CL of 33 inches, yielding a compression ratio CR of 1.333, or a compressed length CL which was about 75% of the fully extended length FL of the chain segment 60 without the elastic rod 30 installed. With the elastic rod 30 installed, the chain segment 60 was extendable to a maximum extended length EL of 43.8 inches, such that the chain segment 60 with the elastic rod 30 installed was extendable to between about 99.5% to 99.8% of its fully extended length FL.

Referring now to FIGS. 6 and 7, shown in FIG. 6 is a schematic illustration of a damped chain assembly 200 including a damping device 20, and in FIG. 7 an enlarged portion of the damping device 20. The chain damping system 100 comprises the damping device 20 assembled to the chain 10, the damping device 20 including an elastic rod 30 installed to a compressed length CL of a chain segment 60, and further including first and second stoppers 40 attached to first and second rod ends 32, 34 of the elastic rod 30 to retain the rod ends 32, 34 to respective end links 42, 44 of the chain segment 60. The stoppers 40 constrain axial movement of the elastic rod 30 relative to the chain segment 60, and, in a secondary elastic response to a tensile load TF exerted on the chain 10 (see FIG. 13), retain the ends of the elastic rod 30 relative to the end links 42, 44 to initiate an elongation of the elastic rod 30 which generates an elongation force EF exerted by the elastic rod on the chain segment 60 to dampen and resist extension of the chain segment from its compressed length CL by the tensile force TF. In the example shown in FIGS. 6. 7 and 9, the stoppers 40 are configured to act as fasteners, in the present example, adjustable plastic ties also referred to as zip ties, to attach the elastic rod 30 to the chain link 12 and such that the compressed links 12 of the chain segment 60 are retained between the rod ends 32, 34. Other configurations of stoppers 40 can be used including stoppers which are glued, adhered, clamped, tethered, screwed, or otherwise fastened to the rod ends 32, 34 and/or to the chain links 12 to retain the elastic rod 30 relative to the chain segment 60. The stopper 40 can be configured as a fastener to physically attach the rod end 32, 34 to the chain link 12, or can be attached to the rod end 32, 34 to stop movement of the rod end 32, 34 from the chain aperture 14 of the end link 42,44 through which the rod end 32, 34 is inserted, as shown in the example illustrated by FIG. 8. In the example shown in FIG. 8, the stopper 40, in this case, a cylindrical shaped stopper, has a cross-sectional area larger than the chain aperture 14, such that the stopper 40 attached to the rod end 32, 34 stops movement of rod end 32, 34 through the end link 42, 44, including retaining the rod end 32, 34 in its position relative to the end link 42, 44 when the chain segment 60 exerts a chain force CF on the damping device 20 in response to a tensile force TF applied to the chain 10, during which the stopper 40 and the end link 42, 44 come in contact and define a contact interface 48 therebetween. (See FIG. 13.).

Referring to FIGS. 6-9, shown are damping devices 20 which each further include a plurality of spacers 50 assembled to the elastic rod 30 and/or to the links 12 of the chain segment 60. In the example shown in FIGS. 6 and 7, the spacers 50 are configured as zip ties distributed along the length of the elastic rod 30 at a spacer interval SI, where the zip ties are installed such that the elastic rod 30 is attached to a respective bypass-link 16 of the chain segment 60 with each respective spacer (zip tie) 50. In the example configuration, the elastic rod 30 is held in contact with bypass-link 16 where it is attached by the zip tie spacer 50, to define a contact interface 48 therebetween, as shown in FIG. 7 and FIG. 12. The spacers 50, in this configuration, retain the compressed links 12 in a fixed position relative to the elastic rod 30, which is constant during elongation and compression of the chain segment 60 in response to tensile forces TF imposed on the chain 10 and transmitted to and through the chain segment 60. By fixedly attaching the chain links 12 to the elastic rod 30 at spacer intervals SI, the elastic response of the damping device 20 is generated uniformly along the axial length of the damping device 20 and/or the elastic rod 30. The configuration of the spacers 50 as a zip tie in the present example is non-limiting, and it would be understood that other configurations of spacers 50 may be used which function to fixedly attach the elastic rod 30 to the chain links 12 of the chain segment 60 including, for example, clips, bands, strapping, adhesives including glues, etc. In the example shown in FIGS. 6 and 7, the spacers 50 are fastened to each bypass-link 16 and the compressed chain links 12 of the chain segment 60 are uniformly distributed along the length of the elastic rod 30 such that the spacer interval SI between each adjacent pair of through-links 22 is substantially the same. This example is non-limiting, and it would be understood that other arrangements of the spacers 50 may be installed to a damping device 20, including the installation of spacers at non-uniform spacing intervals and/or to retain the elastic rod 30 to either or both of the bypass-links 16 and through-links 22, or a combination thereof, etc.

Referring to FIGS. 8 and 14 and FIGS. 9 and 15, with FIG. 15 showing an enlarged section of the chain segment 60 and damping device 20 of FIG. 9, other examples of spacers 50 installed to damping devices 20 are shown. In the present examples, and as shown in FIG. 18, spacers 50 are configured as cylindrical sleeves having a spacer opening 52 to receive the elastic rod 30. The dimension of the spacer opening 52 is such that the elastic rod 30 can be inserted into and through the spacer opening 50, to retain the cylindrical spacer 50 on the elastic rod 30. In one example, the cylindrical wall of the spacer 50 is continuous, and the spacer is installed to the damping device 20 and the chain segment by positioning the spacer 50 in the installed position, and threading, e.g., inserting the elastic rod 30 through the spacer opening 52 concurrent with inserting the elastic rod 30 through the through-links 22 of the chain segment 60. In another example, the cylindrical wall of the spacer 50 may include slot 54 formed therein, as shown for the example spacers illustrated in FIGS. 21 and 22, such that the cylindrical spacer 50 can be installed to the elastic rod 30 at any time, by opening the slot and pressing the spacer 50 into position over the elastic rod 30 in the installed position along the length of the elastic rod 30 and/or relative to a predetermined link 12 of the chain segment 60. The slot 54 may also be referred to herein as a slit, where the slot 54 is functional to allow manipulation of the spacer 50 on to the elastic rod 50 in an installed position. The spacer opening 52 may be configured such that, when the spacer is positioned on to the elastic rod 30, an interference fit is achieved between the outer surface of the elastic rod 30 and the inner surface of the spacer 50 defining the spacer opening 52, such that the spacer 50 is retained in position relative to the length of the elastic rod 30, and/or provides a resistive force to displacement from the installed position, for example, during extension of the compressed chain links 12 in response to a tensile force TF exerted on the chain segment 60. In one example, the spacer 50 can be adhered or otherwise fastened to the elastic rod 30, using an adhesive, glue, clamp, retainer, tie, band, or other type fastener.

Referring again to FIGS. 8 and 18, the spacer 50 defines an interface dimension 58, as shown in FIG. 18, which approximates the distance from the rod axis 36 to the outer surface 56 of the spacer 50. In use, the outer surface 56 of the spacer 50 makes contact with a surface of an adjacent chain link 12 to define a contact interface 48 therebetween, as shown in FIG. 8. During loading of the chain 10, e.g., in response to a tensile force TF imposed on the chain 10 and chain segment 60, the chain segment 60 extends from the compressed length CL to an extended length EL and exerts a chain force CF, as shown in FIG. 13, on the spacer 50, which generates an elastic response from the spacer 50, shown in FIG. 13 as a spacer force SF, which is transmitted to the chain segment 60 via the contact interface 48. As such, it would be understood that the size (area) and shape of the contact interface 48 changes as the tensile force TF and chain force CF is varied and as the elastic response of the spacer 50, including elastic deformation of the spacer outer surface 56 and the spacer force SF varies in response to the varying tensile and chain forces TF, CF.

The size, shape, distribution and placement of spacers 50 can be varied to configure a damping device 20 which when installed will achieve a desired compression ratio CR of the chain segment 60 to which it is installed. By way of non-limiting example, a comparison of the damping devices 20 shown in FIGS. 6, 8 and 9 illustrate differences in compression ratio CR which are resultant from the use of different types and shapes of spacers 50 and differences in the distribution and placement of spacers 50 in damping devices 20.

Referring now to FIGS. 14 and 15, the effect of spacing interval SI and the distribution and placement of spacers 50 on compression ratio CR is illustrated. FIGS. 14 and 15 show schematic views of two differently configured damping devices 20. In FIG. 14, spacers 50A, 50B, 50C are positioned along the elastic rod 30 such that each of the spacers 50A, 50B, 50C is adjacent to a respective bypass-link 16 and such that the outer surface 56 of the spacer 50 is in contact with the adjacent bypass-link 16. Each spacer 50A, 50B, 50C is positioned between two adjacent through-links 22 connected by the bypass-link 16 adjacent to the respective spacer such that the elastic rod 30 passes through one through-link 22 between adjacent spacers 50. The damping device 20 configured as shown, is characterized by a compression ratio of about 1.2, e.g., the chain segment 60 is compressed on the damping device 20 to about 83% of its fully extended length.

In contrast, the damping device 20 and chain segment 60 shown in FIG. 15 is configured such that each of the spacers 50D, 50E, 50F are positioned at a spacer interval SI along the elastic rod 30 at a spacer interval SI which is greater than the spacer interval SI of the damping device 20 shown in FIG. 14. The spacers 50D, 50E, 50F in the damping device shown in FIG. 15 are positioned similar to the positioning of spacers 50A, 50B, 50C, that is, each of the spacers 50D, 50E, 50F is adjacent to a respective bypass-link 16 such that the outer surface 56 of the spacer 50 is in contact with the adjacent bypass-link 16, and each spacer 50D, 50E, 50F is positioned between two adjacent through-links 22 connected by the bypass-link 16 adjacent to the respective spacer. However, the damping device 20 shown in FIG. 15 differs from the damping device 20 shown in FIG. 14, in that the elastic rod 30 passes through two adjacent through-links 22 and is in adjacent contact with a bypass link 16 therebetween, such that damping device 20 shown in FIG. 15 is characterized by a compression ratio of about 1.4, e.g., the chain segment 60 is compressed on the damping device 20 to about 72% of its fully extended length.

FIGS. 16 and 17 and FIGS. 19-22 show, by way of non-limiting examples, other configurations of spacers 50 which can be installed to the damping devices 20 described herein, where the combination of types, sizes, shapes, durometers, material, etc. of spacers 50, and the number and arrangement of the spacers 50 installed to an elastic rod 30 and/or to one or more elastic rods 30 of a plurality of damping devices 20 installed to a chain 10 to form a damped chain assembly 200 may be varied from one elastic rod 30 to another, and/or from one damping device 20 to another, within a chain damping system 100 installed to the chain 10. The various spacers 50 can also function as stoppers 40, for example, as shown in FIGS. 8 and 16, where the spacers 50 and stoppers 40 are similarly configured. In the examples shown in FIGS. 8 and 16, a different retention means may be used to attach a stopper 40 and a spacer 50 which are of like configuration. For example, referring to FIGS. 8 and 16, the spacers 50 may be positioned on the elastic rod 30 such that the spacers 50 are slidable along the elastic rod 30. In contrast, the stoppers 40 can be affixed to the rod ends 32, 34 by an adhesive or other fastening means, to retain the stopper 40 in position on the rod end 32, 34, including retaining the stopper 40 on the rod end 32, 34 in a loaded condition, e.g., when subjected to tensile force TF transferred to the stopper 40 by a chain force CF resultant from the TF imposed on the damping device 20. Referring to FIGS. 16-22, it would be understood that each of the non-limiting shapes of spacers 50 could be formed in a variety of different elastomeric, polymer-based and/or rubber-based materials, at a variety of durometers and/or hardnesses and/or ranges of elasticity, such that a combination of spacers 50 could be selected and installed to a damping device 20 to tune, e.g., calibrate, the damping and elastic response of the damping device 20 to a specified tensile force TF or other use condition, with a predetermined range. Accordingly, the chain damping system 100 described herein could be configured as a damping system 100 comprising a "kit" or assemblage or components 30, 40, 50 of differing sizes, lengths, dimensions, materials, levels of elasticity, durometer, etc., provided to a user to assemble damping devices 20 which are tuned and/or configured to the user's specific needs and/or use conditions. It would further be understood in many configurations, the damping device 20 can be removed after installed, e.g., uninstalled, disassembled, reassembled, reinstalled and/or reconfigured such that multiple and different damping devices 20 and/or chain damping systems 100 can be formed from the component "kit," according to the specific needs to the application, the user, the moored object/watercraft, the chain 10, the mooring apparatus, and/or the operating conditions under which mooring is occurring.

Damping and Elastic Response of Damping Device to Tensile Loading of Chain

FIGS. 10-13 illustrate force diagrams showing the damping and elastic response of the various components 30, 40, 50 and damping devices 20 in response to chain forces CF generated in response to tensile forces TF imposed on the chain 10 to which the chain damping system 100 is installed, and imposed by the chain segment 60 on the damping device 20 installed to the chain segment 60. A force can also be referred to herein as a load. For example, tensile force TF can also be referred to herein as a tensile load TF. For simplicity of illustration, the force reactions in the figures are described assuming an initial condition of the damped chain assembly 200 where the compressed chain segment 60 is at its compressed length CL when the tensile force TF is applied to the chain 10, such that the applied tensile force TF causes extension of the chain segment 60 from its initial compressed length CL to an extended length EL, and such that, when the applied tensile force TF is reduced in magnitude and/or the chain assembly 200 returns to an unloaded condition, the chain segment 60, in response to the damping and compressive forces exerted on it by the damping device 20, contracts to a shorter length which is less than the extended length EL corresponding to, e.g. resultant from, the applied tensile force TF. As described previously, as the tensile force TF exerted on the chain assembly 200 varies over time with changes in use condition (for a mooring chain, changes in wind, wave, current, water depth, etc. conditions), the chain segment 60 will extend to an extended length EL which will vary over time and in response to the tensile force TF counteracted by the elastic response of the damping device 20, between the compressed length CL (when unloaded or under minimal load) and approximately 95%-98% of its fully extended length FL.

Referring to FIGS. 10 and 11, FIG. 10 is a schematic view of the chain assembly 200 of FIG. 1, illustrating a force diagram including a damping force DF generated by the damping device 20 as an initial elastic response to an initial force IF, where the initial force IF is characterized as a shock load or like rapid significant change in tensile force TF exerted on the chain 10 and chain segment 60 of the damped chain assembly 200. As shown in FIG. 10, the initial tensile force TF characterized in the present example as a shock or jerk load is transmitted via the chain 10 to the chain segment 60, initiating extension of the chain segment 60 from its compressed length CL to an extended length EL in response to the tensile force TF. During extension of the chain segment 60, the links 12 of the extending chain segment 60 impose upon and exert a contact force, shown in FIG. 10 as the initial force IF, on the elastic rod 30 of the damping device 20 installed to the chain segment 60, defining a plurality of contact interfaces 48 between the chain links 12 and the surface of the elastic rod 30. The elastic rod 30 generates an initial elastic response to the initial force IF, shown in FIG. 10 as a damping force DF. Generating the initial elastic response and damping force DF can include, for example, the imposing chain link 12 elastically deforming the elastic rod 30 at the contact interface 48, and the elastic rod 30 resisting the deformation to provide a responsive force DF to absorb (dampen) the initial force IF, and to counter extension of the chain segment 60 by the tensile force TF as it is initially transmitted through the links 12 of the chain segment 60. For example, as the chain segment 60 begins to extend from its compressed length CL, the elastic rod 30 in contact with the chain links 12 at the contact interfaces 48 exerts a resistive damping force DF which dampens the application of the initial force IF to the elastic rod 30, resists extension of the chain segment 60, and slows the extension rate of the chain segment 60 while reducing chain link to chain link shock loading and contact, such that shock loading of the chain links 12 in the chain segment 60 is minimized and/or avoided during the initial tensile force TF event.

Referring to FIG. 11, as the tensile force TF is sustained and/or increases, the extending chain segment 60 exerts a chain force CF on the elastic rod 30 of the damping device 20 which is transverse to the rod axis 36 of the elastic rod 30, and which is countered with a transverse rod force RF generated as an elastic response of the elastic rod 30, in a 3-point load or fulcrum type response, to slow, resist, and/or impede extension of the chain segment 60 to a longer extended length. Accordingly, the damping system 20 including the elastic rod 30 generates a damping response and elastic response via a rod force RF which is transverse to the longitudinal axis of the chain assembly 200, e.g., the elastic force response is predominantly non-axial, reducing stress on the chain links 12 and the chain 10, and reducing the chain load exerted on an object, such as a watercraft, connected to the chain 10.

In the example shown in FIG. 12, the damping device 20 further includes spacers 50, which in the present example are configured as zip tie fastener type spacers, generate a spacer force SF to retain the position of the compressed chain segment 60 relative to the elastic rod 30, generating additional resistance to elongation of the chain segment 60 in response to the tensile force TF.

In the example shown in FIG. 13, the damping device 20 includes spacers 50, which in the present example are generally cylinder shaped and positioned on the elastic rod as previously described for FIG. 8. The damping device 20 configured as shown provide multiple elastic responses to a tensile force TF imposed on the chain segment 60 via the chain 10, including, as described related to FIGS. 10 and 11, elastic responses in the form of damping force DF and rod force RF generated by the elastic rod 30 at contact interfaces 48 defined by contact between the links 12 of the chain segment 60 and the surface of the elastic rod 30, where the damping force DF and rod force RF act in a direction transverse to the longitudinal chain axis 46 and the longitudinal rod axis 36, to resist elongation of the chain segment 60 by the tensile force TF. In addition, in response to elongation of the chain segment 60 by the tensile force TF, the bypass-links 16 of the chain segment 20 contact the outer surface 56 of the spacer 50 at a contact interface, and similar to the response mechanism of the elastic rod 30 to contact by the elongating chain segment 60, the spacer 50 generates an elastic response which can include a spacer force SF generated in a direction transverse to the chain and rod axes 46, 36, which can include a damping response resultant from elastic deformation of the outer surface 56 by the imposing chain link 12, a space force SF countering the chain force CF to resist elongation of the chain segment 60 from its compressed length CL to an elongated length EL. The spacer 50 can also generate an axial space force by interfering with and/or constricting axial movement of the through-links 22 of the chain segment 60 relative to the elastic rod 30, as the spacers 50 are too large to pass through the chain aperture 14 of the through-link 22, thus imposing a spacer force SF which is normal to the axis 46 of the through-link 22. In the example shown in FIG. 13, an additional elastic response is generated by the stoppers 40 and attached elastic rod 30, where the stoppers 40 define a contact interface 48 with the respective end links 42, 44 of the chain segment 60, such that, as the tensile force TF acts to elongate the chain segment 60, and therefore, to elongate the elastic rod 30 attached at rod ends 32, 34 retained to respective end links 42, 44 by the stoppers 40, the retained elastic rod 30 exerts a resistive force EF to elongation of the elastic rod 30, the resistive force EF defined, for example, by the elasticity, durometer and cross-section of the elastic rod 30, which acts to reduce the tensile force TF transmitted through the chain segment 60 by instead, transmitting at least a portion of the tensile force TF through the elastic rod 30. Accordingly, the damping device 20 shown in FIG. 13 generates multiple elastic responses to the tensile force TF, including at least a damping force DF, a rod force RF, a spacer force SF and an elongation force EF, which include force vectors which are predominantly transverse to the longitudinal axis 46 of the chain segment 60, to resist elongation of the chain segment 60 in response to the tensile force TF, by impeding movement of the chain links 12 to align with the elastic rod axis 36. The multiple elastic responses can be generated progressively as the tensile force TF increases in magnitude, or may be generated concurrently, as determined by the pattern, magnitude and characteristics of the tensile force TF exerted on the chain 10.

Example Embodiment—Mooring Chain Including Chain Damping System

In a non-limiting illustrative example, a damped mooring chain assembly 200 formed by installing a chain damping system 100 including a plurality of damping devices 20 to a mooring chain 10 is described herein. FIG. 23 illustrates a controlled response of a damped mooring chain assembly 200 to a separation of an elastic rod 30 in a chain segment 60 of a damped mooring chain assembly 200.

In an illustrative example of a mooring chain, a chain damping system 100 configured for installation to a mooring chain 10 to form a damped chain assembly 200 where in use the mooring chain 10 of the damped chain assembly 200 can be attached to a watercraft, to moor the watercraft. In the illustrative example, the chain damping system 100 installed to the mooring chain 10 to form the mooring chain assembly 200 includes a first damping device 20 referred to in the present example as a damping device 20A and a second damping device 20 referred to in the present example as a damping device 20B. The example is non-limiting, such that the chain damping system 100 installed to the mooring chain 10 can include additional damping devices to comprise a plurality of damping devices 20A, 20B . . . 20$n$, each comprising a respective elastic rod 30A, 30B . . . 30$n$ having a rod length within a range of about 2 feet to 40 feet. Each of the plurality of damping devices 20A, 20B . . . 20$n$ is installed to a respective chain segment 60A, 60B . . . 60$n$ having a respective fully extended length FL which is compressed to a respective compressed length CL by the respective damping device 20A, 20B . . . 20$n$ installed thereto, to provide a compression ratio which is within a range of about 1.02 to 2.0. In the present example, the elastic rods 30A, 30B . . . 30$n$ are made of a rubber-based material, such an abrasion resistant polyurethane rubber, a synthetic rubber, a natural rubber blend, etc., as previously described herein. The various elastic rods 30A, 30B . . . 30$n$ may be made of different materials, and/or be provided in different diameters and/or durometers as required to provide different levels of elastic response generated by each of the damping devices 20A, 20B . . . 20$n$ installed to the mooring chain 10.

In the present non-limiting example, the first damping device 20A is configured to respond to relatively lighter tensile forces TF imposed on the mooring chain 10, for example, from relatively light wind, light wave, and light current conditions, and includes an elastic rod 30A which has a relatively lower durometer in a range of about 60 A to 80 A and a relatively higher elasticity for quick response to lighter tensile forces TF. The elastic rod 30A has a rod length in a range of about 4 feet to 40 feet and is installed to a first chain segment 60A of the mooring chain 10, as previously described herein, through a plurality of through-links 22 along the length of the chain segment 60A, with the chain segment 60A compressed along the elastic rod 30A to a compressed length CL with stoppers installed at each rod end 32, 34 of the elastic rod 30A to provides a compression ratio CR for the damping device 20A within a range of about 1.02 to 1.4. Optionally, spacers 50 of one or more configurations can be installed to the first damping device 20A to augment the elastic response with spacer forces SF and/or to increase the compression ratio CR for the damping device, as previously described herein.

In the present non-limiting example, the second damping device 20B is configured to respond to relatively higher tensile forces TF imposed on the mooring chain 10, for example, from relatively high wind, high wave, and strong current conditions, and includes an elastic rod 30B which has a relatively higher durometer in a range of about 80 A to 75 D and a relatively lower elasticity for responding to the relatively higher tensile forces TF and initial shock forces IF imposed on the mooring chain 10. The second elastic rod 30B has a rod length in a range of about 4 feet to 40 feet and is installed to a second chain segment 60B of the mooring chain 10, as previously described herein, through a plurality of through-links 22 along the length of the chain segment 60B, with the chain segment 60B compressed along the second elastic rod 30B to a compressed length CL with stoppers installed at each rod end 32, 34 of the elastic rod 30B to provide a compression ratio CR for the second damping device 20B within a range of about 1.2 to 2.0. Preferably, spacers 50 of one or more configurations can be installed to the second damping device 20B to augment the elastic response with spacer forces SF and/or to increase the compression ratio CR for the damping device 20, as previously described herein.

In the present non-limiting example, the chain damping system 100 can include at least one additional damping device 20n installed to the mooring chain 10. For illustration, the damping device 20n may be installed to respond to a range of use conditions (wind, current, wave) which is intermediate and/or overlapping the lighter and heavier tensile force conditions respectively targeted for response by the configurations of the damping devices 20A and 20B. In one example, the additional damping device 20n may be configured to compress a chain segment 60n to which it is installed from a fully extended length FL to a compressed length CL which is responsive to a change in the depth of water in which the mooring chain assembly 200 is deployed, and/or change the swing radius of the mooring. In one example, the damping device 20n may be selectively installed and/or removed from the mooring chain 10 in response to actual and/or anticipated changes in use conditions including water depth.

Therefore, in the present example of a mooring chain, the preferred embodiment, the combination and configuration of one or more damping devices 20A, 20B, . . . 20n installed respectively to chain segments 60A, 60B, . . . 60n of the mooring chain 10, for use as a mooring chain assembly 200, can be fully optimized for anticipated and/or actual variable use conditions, including light and heavy winds, light and heavy waves, weak and strong currents and shallow and deeper water depth conditions where the damping devices 20A, 20B, . . . 20n installed to the chain are variable in configuration such that the combination of these damping devices 20A, 20B, . . . 20n provide multiple and differing levels of types of elastic responses, in real time, to a varying tensile force TF imposed on the mooring chain assembly 200 by the varying actual use conditions experienced by the moored object, in the present example, a watercraft. The hybrid and variable elastic response, which is generated in real time by the various damping devices 20A, 20B, . . . 20n as each of the respective damping devices 20A, 20B, . . . 20n responds individually and distinctly with a combination of damping forces DF, rod forces RF, spacer forces SF and/or elongation forces EF to the varying tensile force inputs TF to the mooring chain assembly 200 illustrates a significant advantage of the chain damping system 100 described herein, in contrast, for example, to prior art systems such as shock lines and/or snubbers which provide only a singular, axial elongation type response to a tensile force input TF.

As an additional advantage, the chain damping system 100 is configured to generate a controlled response in the event of a separation of the elastic rod 30 within a chain segment 60 as illustrated by FIG. 23 such that, a residual level of chain force damping and compression is retained. This is in contrast to prior art systems such as shock lines and/or snubbers, where in the event of separation or other failure of the shock line and/or the snubber, damping response is no longer generated and the chain 10 and moored watercraft is left exposed and unprotected from variable tensile forces TF imposed on the chain 10 by wind, current and wave conditions, and the chain 10 is left unconstrained from being fully extended such that the chain 10 can be stressed in full extension and impose higher forces including shock loading on the moored watercraft, and/or in the event of separation or other failure of the shock line, the snubber and/or a link 12 of the chain 10, the moored object is subject to disconnection from the chain 10 or its mooring.

Referring to FIG. 23, shown is a schematic view of a portion of a damping device 20 installed to a chain segment 60 of a chain 10, which in the present example is a mooring chain 10. The damping device 20 is configured, in the present example, as described for FIG. 9, and including a plurality of spacers 50 installed along the length of the elastic rod 30. The elastic rod 30 is retained to the chain segment 60 by stoppers 40 installed at each of the rod ends 32, 34 to retain the respective rod ends 32, 34 to respective end links 42, 44 of the chain segment 60. Referring to FIG. 23, in the event of a separation of the elastic rod 30 within the chain segment 60, for example, at the location indicated by arrow W, a controlled response is provided which maintains a substantial portion of the damping and compression capabilities of the damping device 20 as originally installed. Upon separation of the elastic rod 30 at arrow W, the damping device 20 is effectively divided into two residual damping devices 20.1 and 20.2, where, as shown in FIG. 23, damping device 20.1 continues to compress chain segment 60.1 and to provide an elastic response to chain forces CF exerted by the chain segment 60.1 on the residual damping device 20.1. The residual damping device 20.1 is retained to the chain segment 60.1 at the separated end of the elastic rod 30 by the spacer 50 adjacent to the separated end of the elastic rod 30, which functions as a stopper 40.1 to retain the elastic rod 30 to the end link 44.1 of the residual chain segment 60.1. Likewise, upon separation of the elastic rod 30 at arrow W, the second residual damping device 20.2 continues to compress chain segment 60.2 and to provide an elastic response to chain forces CF exerted by the chain segment 60.2 on the residual damping device 20.2, where the spacer 50 adjacent to the separated end of the elastic rod portion 30 in the damping device 20.2 functions as a stopper 40.2 to retain the elastic rod 30 to the end link 44.2 of the residual chain segment 60.2.

Because the advantages described herein for a mooring system can be applied to most load bearing chain systems, there are many other potential applications, such as, but not limited to, mooring chains, anchor chains, tow chains, hoist chains, strap down chains, tie line chains, lift chains, etc. The chain damping system described herein can be used to dampen chains configured to retain objects other than watercraft, for example, other floating objects such as rafts, channel marks, buoys, docks, oil platforms, etc., and/or for on-land applications, such as retaining objects during towing or lifting including vehicles, structures, equipment, etc.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method of installing a chain damping system to a chain including a plurality of links, the method comprising:
   selecting a first elastic rod from a plurality of elastic rods, wherein the first elastic rod is characterized by an elastic response which is different than the elastic response of another elastic rod of the plurality of elastic rods;
   selecting first and second stoppers from a plurality of stoppers, wherein the first and second stoppers are attachment to first and second rod ends of the first elastic rod; and
   inserting the first elastic rod through a plurality of non-consecutive links of a first chain segment of a chain such that the first chain segment is compressed from a fully extended length to a compressed length less than the fully extended length;
   installing the first stopper to the first rod end;
   installing the second stopper to the second rod end;
   wherein the first and second stoppers retain the first chain segment on the first elastic rod.

2. The method of claim 1, further comprising:
   selecting at least one spacer from a plurality of spacers; and
   attaching the at least one spacer to the first elastic rod that each spacer is positioned between non-consecutive links of the first chain segment.

3. The method of claim 2, wherein the at least one spacer is characterized by an elastic response which is different than an elastic response of another spacer of the plurality of spacers.

4. The method of claim 1, further comprising:
   selecting a second elastic rod from the plurality of elastic rods;
   selecting third and fourth stoppers from the plurality of stoppers, wherein the third and fourth stoppers are configured for attachment to first and second rod ends of the second elastic rod; and
   inserting the second elastic rod through a plurality of non-consecutive links of a second chain segment of the chain such that the second chain segment is compressed from a fully extended length to a compressed length less than the fully extended length;
   installing the third and fourth stoppers to the respective first and second rod ends of the second elastic rod such that the third and fourth stoppers retain the second chain segment on the second elastic rod.

5. The method of claim 4, wherein the first elastic rod is characterized by a first elastic response, and the second elastic rod is characterized by a second elastic response which is different from the first elastic response.

6. The method of claim 4, wherein the first elastic rod and the second elastic rod differ in at least one of material, durometer, elasticity, rod diameter, and/or rod length.

7. A method of installing a chain damping system to a chain including a plurality of links, the method comprising:
   assembling a damping device to a segment of the chain, including:
      inserting an elastic rod through a plurality of non-consecutive links of the chain segment;
      wherein the non-consecutive links are through-links;
      wherein each through-link is connected to an adjacent one of the through-links by at least one bypass-link;
      compressing the chain segment from a fully extended length to a compressed length; and
   installing a plurality of spacers to the elastic rod;
   wherein each spacer is positioned at a spacer interval from an adjacent one of the spacers such that at least one through-link is intermediate to the spacer and the adjacent one of the spacers.

8. The method of claim 7, further comprising:
   fixedly attaching each spacer to the elastic rod.

9. The method of claim 7, wherein axial movement of each spacer relative to the elastic rod is constrained by the plurality of through-links.

10. A method of installing a chain damping system to a chain including a plurality of links, the method comprising:
    assembling a damping device to a segment of the chain, including:
       inserting an elastic rod through a plurality of non-consecutive links of the chain segment;
       wherein the non-consecutive links are through-links;
       wherein each through-link is connected to an adjacent one of the through-links by at least one bypass-link;
       compressing the chain segment from a fully extended length to a compressed length;
    wherein:
       the elastic rod includes first and second rod ends;
       the chain segment includes first and last segment links;
       the method further comprising:
          retaining the first rod end to the first segment link; and
          retaining the second rod end to the last segment link.

11. The method of claim 10, further comprising:
    installing a first stopper to the first rod end, wherein the stopper is configured to retain the first rod end to the first segment link; and
    installing a second stopper to the second rod end, wherein the stopper is configured to retain the second rod end to the last segment link.

12. A method of installing a chain damping system to a chain including a plurality of links, the method comprising:
    assembling a damping device to a segment of the chain, including:
       inserting an elastic rod through a plurality of non-consecutive links of the chain segment;
       wherein the non-consecutive links are through-links;
       wherein each through-link is connected to an adjacent one of the through-links by at least one bypass-link;
       compressing the chain segment from a fully extended length to a compressed length; and
    assembling a second damping device to a second chain segment of the chain.

13. A chain damping system configured for damping a chain, the chain damping system comprising:
    a damping device comprising:
       an elastic rod having first and second ends;
       the elastic rod configured for insertion through a plurality of non-consecutive links of a chain segment of the chain such that the chain segment is compressed on the elastic rod from a fully extended length to a compressed length less than the fully extended length of the chain segment;
       first and second stoppers;
       wherein:
          the first stopper is configured to retain the first end of the elastic rod to a first end of the chain segment;
          the second stopper is configured to retain the second end of the elastic rod to a second end of the chain segment; and placement of the first and second stoppers relative to the chain defines the compressed length.

14. The chain damping system of claim 13, the damping device further comprising:
- a plurality of spacers distributed along the axial length of the elastic rod;
- wherein each spacer is positioned at a spacer interval from an adjacent one of the spacers.

15. The chain damping system of claim 13, wherein the damping device is a first damping device installed to the chain segment of the chain;
- the chain damping system further comprising:
  - a second damping device installed to a second chain segment of the chain;
- wherein:
  - the first damping device is characterized by a first elastic response;
  - the second damping device is characterized by a second elastic response; and
- wherein the first elastic response and the second elastic response are different.

* * * * *